(12) United States Patent
Gero et al.

(10) Patent No.: US 8,817,594 B2
(45) Date of Patent: Aug. 26, 2014

(54) TECHNIQUE ESTABLISHING A FORWARDING PATH IN A NETWORK SYSTEM

(75) Inventors: Balázs Peter Gero, Budapest (HU); János Farkas, Kecskemet (HU); Panagiotis Saltsidis, Stockholm (SE); Zhemin Ding, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 218 days.

(21) Appl. No.: 13/181,020

(22) Filed: Jul. 12, 2011

(65) Prior Publication Data
US 2012/0106322 A1 May 3, 2012

Related U.S. Application Data

(60) Provisional application No. 61/363,705, filed on Jul. 13, 2010, provisional application No. 61/382,733, filed on Sep. 14, 2010.

(51) Int. Cl.
| | |
|---|---|
| *H04L 1/00* | (2006.01) |
| *H04L 12/28* | (2006.01) |
| *H04L 12/56* | (2006.01) |
| *H04L 12/437* | (2006.01) |

(52) U.S. Cl.
CPC ............ *H04L 45/28* (2013.01); *H04L 45/04* (2013.01); *H04L 12/437* (2013.01)
USPC ........... 370/217; 370/219; 370/220; 370/225; 370/252

(58) Field of Classification Search
CPC . H04L 45/28; H04L 43/0817; H04L 43/0811; H04L 45/22; H04L 45/00; H04L 41/12; H04L 69/40; H04L 1/22; H04L 41/0663; H04L 41/5003; H04L 67/327; H04L 12/2602; H04L 41/0893; H04L 45/04; H04L 45/306; H04L 45/586; H04L 67/16; H04L 67/322
USPC ......... 370/216–222, 229, 235, 236, 237, 241, 370/242–248, 250–252, 254, 255, 351, 389
See application file for complete search history.

(56) References Cited

U.S. PATENT DOCUMENTS

| | | | |
|---|---|---|---|
| 7,855,950 B2* | 12/2010 | Zwiebel et al. ................ | 370/216 |
| 2006/0268682 A1* | 11/2006 | Vasseur ........................ | 370/216 |

(Continued)

FOREIGN PATENT DOCUMENTS

| | | |
|---|---|---|
| WO | WO 2010/052028 A1 | 5/2010 |
| WO | WO 2011/003457 A1 | 1/2011 |

*Primary Examiner* — Awet Haile

(57) ABSTRACT

A method and network for determining an interconnect node for establishing a forwarding path for service based data within a network system. The method includes assigning, interconnect node status information to network interconnect nodes, wherein a network interconnect node to which a passive status is assigned is only allowed to transmit service based data between an external link and another interconnect node of the network, or between two other interconnect nodes of the network. Only a network interconnect node with active status is allowed to send or receive service based data to or from the network. The method includes determining, for a given service, an interconnect node with active status for establishment of a forwarding path including the interconnect node with active status and an external link, wherein the determination is based on the respective status information assigned to the network interconnect nodes for the service.

32 Claims, 12 Drawing Sheets

(56) References Cited

U.S. PATENT DOCUMENTS

| | | |
|---|---|---|
| 2007/0207591 A1 | 9/2007 | Rahman et al. |
| 2009/0290483 A1* | 11/2009 | Curtis et al. .................. 370/216 |
| 2009/0296568 A1 | 12/2009 | Kitada |
| 2011/0069623 A1* | 3/2011 | Simmons et al. ............. 370/252 |
| 2011/0255417 A1* | 10/2011 | Mohan et al. ............. 370/241.1 |
| 2012/0113835 A1* | 5/2012 | Alon et al. ..................... 370/252 |
| 2012/0127855 A1* | 5/2012 | Alon et al. ..................... 370/218 |

* cited by examiner

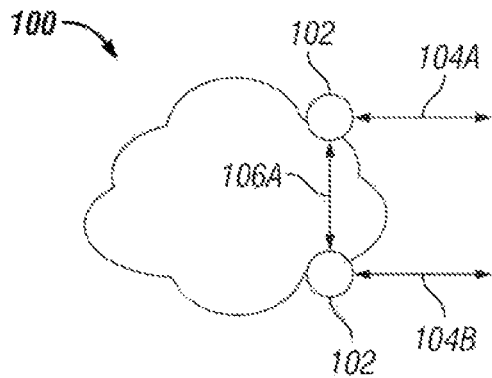

*FIG. 1*

| | |
|---|---|
| 201 | FOR A GIVEN SERVICE, ASSIGNING INTERCONNECT NODE STATUS INFORMATION TO THE NETWORK INTERCONNECT NODES, WHEREIN A NETWORK INTERCONNECT NODE TO WHICH A PASSIVE STATUS IS ASSIGNED IS ONLY ALLOWED TO TRANSMIT SERVICE BASED DATA BETWEEN AN EXTERNAL LINK AND ANOTHER INTERCONNECT NODE OF THE NETWORK, OR BETWEEN TWO OTHER INTERCONNECT NODES OF THE NETWORK, AND WHEREIN ONLY A NETWORK INTERCONNECT NODE TO WHICH AN ACTIVE STATUS IS ASSIGNED IS ALLOWED TO SEND OR RECEIVE SERVICE BASED DATA TO OR FROM THE NETWORK |
| 202 | FOR A GIVEN SERVICE, DETERMINING AN INTERCONNECT NODE HAVING AN ACTIVE STATUS FOR ESTABLISHMENT OF A WORKING PATH INCLUDING THE INTERCONNECT NODE HAVING THE ACTIVE STATUS AND AN EXTERNAL LINK, WHEREIN THE DETERMINATION IS BASED ON THE RESPECTIVE STATUS INFORMATION ASSIGNED TO THE NETWORK INTERCONNECT NODES FOR THE SERVICE |

*FIG. 2*

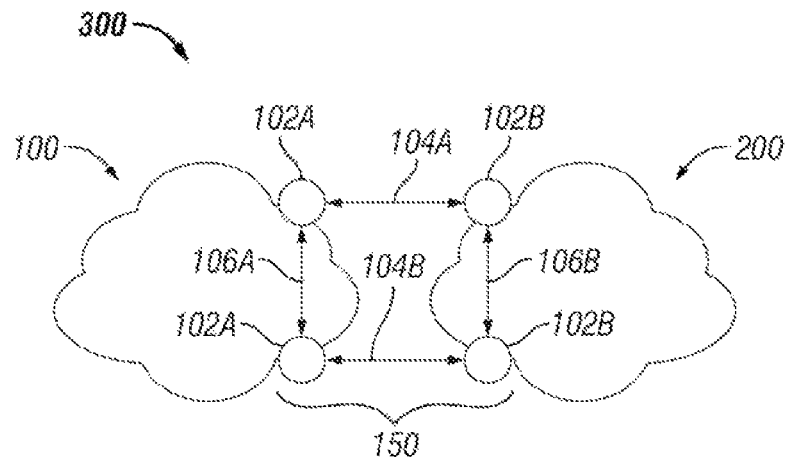

FIG. 3

401 — FOR A GIVEN SERVICE, ASSIGNING INTERCONNECT NODE STATUS INFORMATION TO THE FIRST NETWORK INTERCONNECT NODES, AND TO THE SECOND NETWORK INTERCONNECT NODES, WHEREIN A NETWORK INTERCONNECT NODE TO WHICH A PASSIVE STATUS IS ASSIGNED IS ONLY ALLOWED TO TRANSMIT SERVICE BASED DATA BETWEEN AN EXTERNAL LINK AND ANOTHER INTERCONNECT NODE OF THE NETWORK TO WHICH THE NETWORK INTERCONNECT NODE HAVING THE PASSIVE STATUS BELONGS, OR BETWEEN TWO OTHER INTERCONNECT NODES OF THE NETWORK TO WHICH THE NETWORK INTERCONNECT NODE HAVING THE PASSIVE STATUS BELONGS, AND WHEREIN ONLY A NETWORK INTERCONNECT NODE TO WHICH AN ACTIVE STATUS IS ASSIGNED IS ALLOWED TO SEND OR RECEIVE SERVICE BASED DATA TO OR FROM THE NETWORK TO WHICH THE NETWORK INTERCONNECT NODE HAVING THE ACTIVE STATUS BELONGS

402 — FOR A GIVEN SERVICE, DETERMINING A WORKING PATH BETWEEN AN INTERCONNECT NODE HAVING AN ACTIVE STATUS AND BELONGING TO THE FIRST NETWORK AND AN INTERCONNECT NODE HAVING AN ACTIVE STATUS AND BELONGING TO THE SECOND NETWORK BASED ON THE RESPECTIVE STATUS INFORMATION ASSIGNED TO THE NETWORK INTERCONNECT NODES FOR THE SERVICE, WHEREIN EACH WORKING PATH ONLY COMPRISES TWO NETWORK INTERCONNECT NODES HAVING AN ACTIVE STATUS

FIG. 4

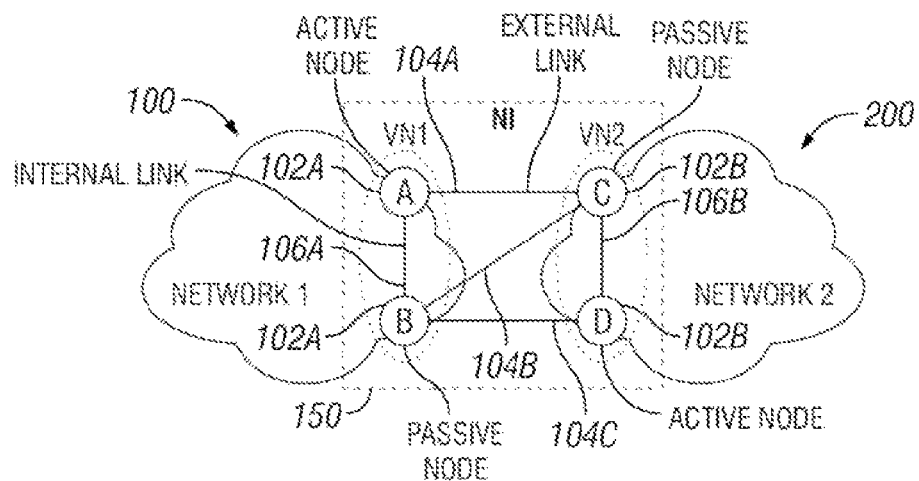
FIG. 13
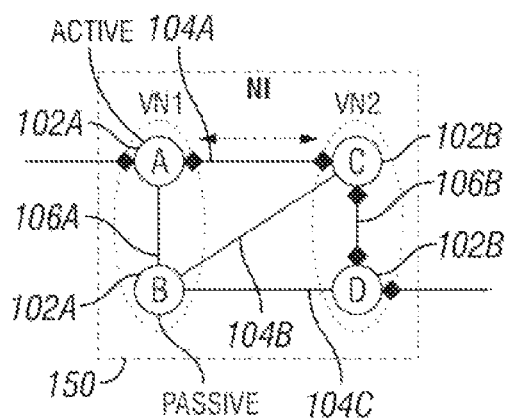    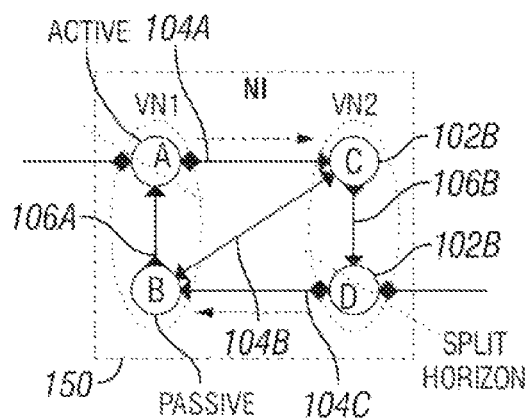
FIG. 14    FIG. 15

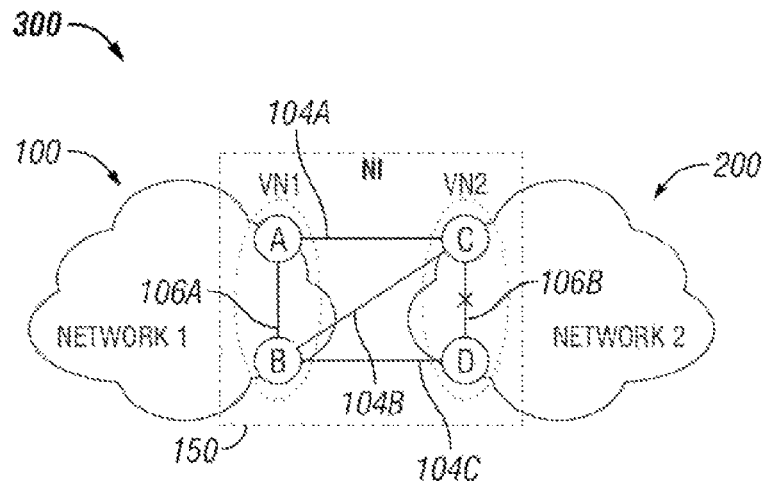
FIG. 16
FIG. 17
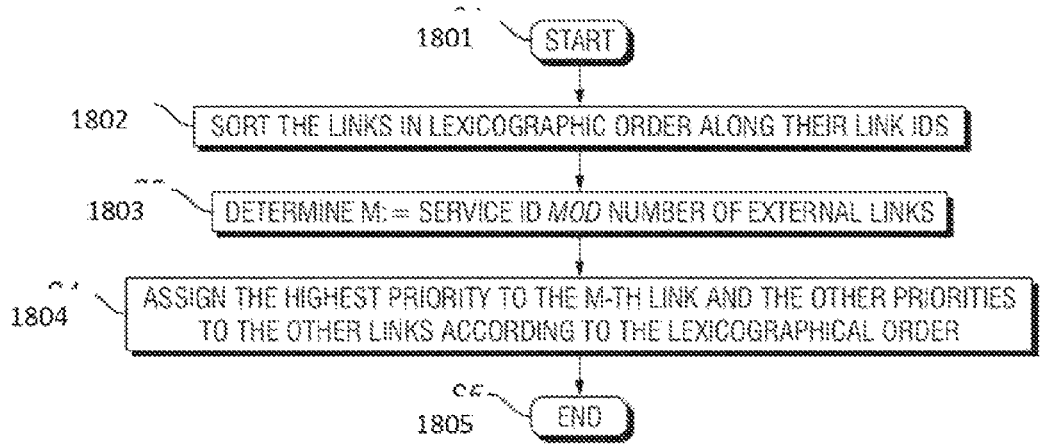
FIG. 18

US 8,817,594 B2

TECHNIQUE ESTABLISHING A FORWARDING PATH IN A NETWORK SYSTEM

CROSS REFERENCE TO RELATED APPLICATIONS

This application is a continuation application which claims the benefit of U.S. Patent Application No. 61/363,705 filed on Jul. 13, 2011, and U.S. Patent Application No. 61/382,733, filed on Sep. 14, 2010, the disclosures of which are fully incorporated herein by reference.

TECHNICAL FIELD

The present disclosure generally relates to the technical field of network systems. In particular, the present disclosure relates to a technique of determining an interconnect node for establishment of a forwarding path for transmitting service based data within a network system comprising a first network and a second network.

BACKGROUND

Large communication systems often comprise a plurality of networks which may be connected with each other via a network interconnect solution. Usually, each network of the communication system comprises a plurality of network nodes which are interconnected through internal links, whereas the networks as a whole are interconnected via external links.

In order to ensure a reliable communication between the networks, there have to be rules about which actions should be taken in each network in case of network changes like a network node failure, an internal link failure, or an external link failure.

Service interfaces generally provide different service-related capabilities such as one or more of service selection, priority selection and service access protection. The Provider Backbone Bridged Network (PBBN) standard defines various service interface types. So-called type III service interfaces represent node redundant service interfaces. Type III service interfaces are controlled by the Layer 2 Gateway Protocol (L2GP) and may form the basis of a node redundant network interconnect. The term "node redundant" indicates that the network interconnect is able to "survive" a node failure.

It has, however, been found that a node redundant network interconnect based on type III service interfaces cannot always satisfactorily cope with network changes like a network node failure, an internal link failure, or an external link failure. As an example, a failure in a first network may in certain situations propagate in a second network. Specifically, if an active edge node of the first network has a failure, the active service interface link (i.e., an external link) to the second network may change, so that the second network has to adapt accordingly. Moreover, certain service-related assignments of a first network and a second network such as service to External Network Network Interface assignments may be coupled.

SUMMARY

A need arises to define mechanisms which make it possible to flexibly react to network changes like a network node failure, an internal link failure, or an external link failure in order to maintain, during network changes, communication between the networks of the communication system.

According to a first aspect, a method of determining an interconnect node for establishment of a forwarding path for transmitting service based data within a network system comprising a first network and a second network is provided, wherein the first network comprises a plurality of network interconnect nodes connectable to a plurality of external links towards the second network, and one or more internal links connecting the network interconnect nodes with each other. The method comprises assigning, for a given service, interconnect node status information to the network interconnect nodes, wherein a network interconnect node to which a passive status is assigned is only allowed to transmit service based data between an external link and another interconnect node of the network, or between two other interconnect nodes of the network, and wherein only a network interconnect node to which an active status is assigned is allowed to send or receive service based data to or from the network. The method further comprises determining, for a given service, an interconnect node having an active status for establishment of a forwarding path including the interconnect node having the active status and an external link, wherein the determination is based on the respective status information assigned to the network interconnect nodes for the service.

According to a second aspect, a method of determining a forwarding path for transmitting service based data within a network system comprising a first network and a second network being connected with each other by a network interconnect is provided, wherein the network interconnect comprises a plurality of first network interconnect nodes provided in the first network, a plurality of second network interconnect nodes provided in the second network, a plurality of external links connecting the first network interconnect nodes with the second network interconnect nodes, one or more first internal links connecting the first network interconnect nodes and provided within the first network, and one or more second internal links connecting the second network interconnect nodes and provided within the second network. The method comprises, for a given service, assigning interconnect node status information to the first network interconnect nodes and to the second network interconnect nodes, wherein a network interconnect node to which a passive status is assigned is only allowed to transmit service based data between an external link and another interconnect node of the network to which the network interconnect node having the passive status belongs, or between two other interconnect nodes of the network to which the network interconnect node having the passive status belongs, and wherein only a network interconnect node to which an active status is assigned is allowed to send or receive service based data to or from the network to which the network interconnect node having the active status belongs. The method further comprises, for a given service, determining a forwarding path between an interconnect node having an active status and belonging to the first network and an interconnect node having an active status and belonging to the second network based on the respective status information assigned to the network interconnect nodes for the service, wherein each forwarding path only comprises two network interconnect nodes having an active status.

For a given service, external link information may be assigned to the external links, and the forwarding path between the interconnect node having an active status and belonging to the first network and the interconnect node having an active status and belonging to the second network may be determined based on external link information assigned to the external links for the service. In this way, the reaction of the first network and the second network to network changes may take external link changes into account.

The assignment of the interconnect node status information to the first network interconnect nodes and, optionally, at least a part of the assignment of the external link information to the external links may be carried out by the first network in a first assignment process, and the assignment of the interconnect node status information to the second network interconnect nodes and, optionally, at least a part of the assignment of the external link information to the external links may be carried out by the second network in a second assignment process, wherein the first network and the second network may carry out said assignment processes independently from each other. Carrying out the assignment processes independently from each other enables each of the first network and the second network to flexibly react to network changes since each network does not necessarily have to care about the state or setting of the respective other network.

In the first assignment process, the first network may assign for a given service at least one of: interconnect node priority information to the first network interconnect nodes which indicates with which priority a first network interconnect node should be used as interconnect node having an active status for the forwarding path of the service, and external link priority information to the external links which indicates with which priority an external link should be used for the forwarding path of the service. In the second assignment process, the second network may assign for a given service at least one of: interconnect node priority information to the second network interconnect nodes which indicates with which priority a second network interconnect node should be used as interconnect node having an active status for the forwarding path of the service, and external link priority information to the external links which indicates with which priority an external link should be used for the forwarding path of the service. The use of interconnect node priority information and external link priority information enables each of the first network and the second network to react on network changes, and also makes it possible to coordinate reactions of the first network with the reactions of the second network.

The interconnect node status information generated by the first network may be distributed to the first network interconnect nodes and to the second network interconnect nodes, and the interconnect node status information generated by the second network may be distributed to the second network interconnect nodes and to the first network interconnect nodes. This makes it possible for a network to take into account the interconnect node status information of the respective other network when reacting to network changes.

At least some of the services may be congruent services in which the part of the forwarding path for transmitting data from the first network to the second network coincides with the part of the forwarding path for transmitting data from the second network to the first network. In the case of congruent services, the following variants may be implemented The interconnect node priority information may be generated for a congruent service after having generated the external link priority information for the congruent service. In this way reactions of the first network may be coordinated with the reactions of the second network. The generation of the interconnect node priority information for a congruent service may comprise, for an individual network interconnect node, determining the external links which are directly connected to the network interconnect node and to which of the directly connected external links the highest priority is assigned for the congruent service, and assigning the priority of the external link having the highest priority for the congruent service to the network interconnect node.

The external link priority information assigned to the external links for a congruent service may be generated based on information which is available for both the first network and the second network. In this way, it can be ensured that no inconsistency in external link priority information is generated when generating external link priority information independently both in the first network and in the second network. For example, the external link: priority information for a congruent service may be generated based on link identification numbers assigned the available external links, respectively, and a service identification number assigned to the congruent service.

As a more concrete example, the external link priority information for a congruent service may be generated using the following steps: sorting the available external links according to the lexicographical order of the link identification numbers, determining m:=(service identification number) mod (number of available external links), and assigning the highest priority to the m-th external link and the other priorities to the other external links according to the lexicographical order of the link identification numbers.

At least some of the services may be non-congruent services in which the part of the forwarding path for transmitting data from the first network to the second network does not coincide with the part of the forwarding path for transmitting data from the second network to the first network. In the case of non-congruent services, the following variants may be implemented.

The first network may generate for a non-congruent service external link priority information for parts of the forwarding path via which service based data for the service is sent from the first network to the second network, and the second network may generate for the non-congruent service external link priority information for parts of the forwarding path via which service based data for the service is sent from the second network to the first network. Thus, the first network and the second network can operate independently from each other.

According to one variant, for each non-congruent service, the current external link used by the service to send service based data from the first network to the second network is signaled from the first network to the second network, and the current external link used by the service to send service based data from the second network to the first network is signaled from the second network to the first network. In this way, each network knows all information necessary to react on network changes without disturbing the operation of the other network.

The interconnect node priority information is generated for a non-congruent service before generating the external link priority information for the non-congruent service. This makes it possible to effectively and transparently create priority information.

As an example, in case of a non-congruent service the interconnect node priority information may be generated using the following steps: sorting the available interconnect nodes according to the lexicographical order of the interconnect node identification numbers, determining m:=(interconnect node identification number) mod (number of available interconnect nodes), and assigning the highest priority to the m-th interconnect node and the other priorities to the other interconnect nodes according to the lexicographical order of the interconnect node identification numbers.

More specifically, the external link priority information may be generated for a non-congruent service using the following steps: determining whether, to a network interconnect node, more than one external link is connected; if more than one external link is connected, carry out the following processes: sorting the connected external links according to the lexicographical order of port identification numbers of the network interconnect node, determining m:=(service identification number) mod (number of available external links), and assigning the highest priority to the m-th external link and the other priorities to the other external links according to the lexicographical order of the port identification numbers.

According to one implementation, external link status information indicating the status of external links is forwarded to the network interconnect nodes of the first network and the second network. The network interconnect nodes may thus easily determine whether an external link has failed or not. Internal link status information indicating the status of internal links provided in the first network may be forwarded to the network interconnect nodes of the first network and, optionally, to the network interconnect nodes of the second network. Moreover, internal link status information indicating the status of internal links provided in the second network may be forwarded to the network interconnect nodes of the second network and, optionally, to the network interconnect nodes of the first network. The link status information may for example be exchanged using one of CCM messages and LACPDUs. Other communication protocols may be used.

According to an exemplary realization, within the first network and the second network, different internal links may respectively be used to transmit user data and control data used to control the transmission of user data between two network interconnect nodes. In this way, chances to maintain data communication in case of network changes can be further increased.

In case of an external link failure, an internal link failure, a network interconnect node failure, or a change in the number of network interconnect nodes in the first network or in the second network, the forwarding path may be redefined for a given service based on the interconnect node priority information and the external link priority information assigned to the service for which the forwarding path is affected, wherein the redefinition of at least a part of the forwarding path belonging to the first network may be done by the first network, and wherein the redefinition of at least a part of the forwarding path belonging to the second network may be done by the second network. In the following, some possible reactions in these failure scenarios are discussed:

In case of an external link failure, the following steps may respectively be carried out in the first network and in the second network: determining, for a given service which is affected by the failed external link, the highest priority available external link based on the external link priority information, and defining, for a given service which is affected by the failed external link, a part of a new forwarding path based on the status information and the determined highest priority available external link.

In case of a network interconnect node failure, for a given service which is affected by the failed interconnect node, the following steps may be carried out in the network where the failed network interconnect node is located: determining the highest priority available node and assigning an active status to the highest priority available node, if necessary, determining the highest priority available external link based on the external link priority information, defining a part of a new forwarding path based on the status information and the selected highest priority available external link. Further, for a given service which is affected by the failed interconnect node, the following steps may be carried out in the other network: determining the highest priority available external link based on the external link priority information, and defining a part of a new forwarding path based on the status information and the selected highest priority available external link.

In case of an internal link failure, in the network where the failed internal link is located, the following steps may be carried out: changing the status information such that to one single common network interconnect node an active status is assigned for each service, deactivating the ports of the network interconnect nodes connected to external links which are different from the external links connected to the common network interconnect node for each service, selecting the highest priority available external link connected to the common network interconnect node for a given service, and defining, for a given service, a part of a new forwarding path based on the status information and the selected highest priority available external link. Further, the following steps may be carried out in the other network: determining, for a given service which is affected by the deactivated ports, the highest priority available external link based on the external link priority information, and defining, for a given service which is affected by the deactivated ports, a part of a new forwarding path based on the status information and the determined highest priority available external link.

In case of an internal link failure, in the network where the failed internal link is located, the following steps may be carried out: determining for which congruent services service based data received via external links is destined to a network interconnect node which is unavailable due to the internal link failure, determining, for the congruent service thus determined, the highest priority available interconnect node based on the interconnect node priority information, assigning, for the congruent service thus determined, an active status to the highest priority available interconnect node, and defining, for the congruent service thus determined, a part of a new forwarding path based on the status information and the external link information.

Still further, in case of an internal link failure, in the network where the failed internal link is located, the following steps may be carried out: determining for which non-congruent services service based data received via external links is destined to a network interconnect node which is unavailable due to the internal link failure, determining, for the non-congruent service thus determined, the highest priority available interconnect node based on the interconnect node priority information, assigning, for the non-congruent service thus determined, an active status to the highest priority available interconnect node, determining which external link will be used for the non-congruent service thus determined in the future in order to send service-based data from the network where the failed internal link is located to the other network based on the external link priority information, and signaling this external link to the other network, and defining, for the congruent service, a part of a new forwarding path based on the status information and the external link information.

A common bundle identification number may be used instead of a service identification number for a group of services for transmitting service based data between the first network and the second network. In this way, the reaction to network changes can be efficiently handled for a plurality of services (i.e. group of services) at the same time. A group of services may comprise the services which are received in one of the first network or the second network via the same external link and which are routed to the same network interconnect node in this network.

According to another aspect, a computer program product is provided comprising program code portions for performing the steps of any one of the above described embodiments when the computer program product is executed on one or more computing devices. The computer program product may be stored on a computer-readable recording medium. Alternatively, the computer program product may be provided for download onto such a recording medium.

According to a further aspect, a network is provided, comprising: a plurality of network interconnect nodes connectable to a plurality of external links towards another network, and one or more internal links connecting the network interconnect nodes with each other. The network has functionality to carry out the following processes: for a given service, assigning interconnect node status information to the network interconnect nodes, wherein a network interconnect node to which a passive status is assigned is only allowed to transmit service based data between an external link and another interconnect node of the network, or between two other interconnect nodes of the network, and wherein only a network interconnect node to which an active status is assigned is allowed to send or receive service based data to or from the network, and for a given service, determining an interconnect node having an active status for establishment of a forwarding path including the interconnect node having the active status and an external link, wherein the determination is based on the respective status information assigned to the network interconnect nodes for the service.

According to a still further aspect, a network system is provided comprising a first network and a second network being connected with each other by a network interconnect. The network interconnect comprises: a plurality of first network interconnect nodes provided in the first network, a plurality of second network interconnect nodes provided in the second network, a plurality of external links connecting the first network interconnect nodes with the second network interconnect nodes, and one or more first internal links connecting the first network interconnect nodes and provided within the first network, and one or more second internal links connecting the second network interconnect nodes and provided within the second network. The network system comprises functionality to carry out the following processes: for a given service, assigning interconnect node status information to the first network interconnect nodes and to the second network interconnect nodes, wherein a network interconnect node to which a passive status is assigned is only allowed to transmit service based data between an external link and another interconnect node of the network to which the network interconnect node having the passive status belongs, or between two other interconnect nodes of the network to which the network interconnect node having the passive status belongs, and wherein only a network interconnect node to which an active status is assigned is allowed to send or receive service based data to or from the network to which the network interconnect node having the active status belongs. The network system further comprises functionality to carry out the following processes: and for a given service, determining a forwarding path between an interconnect node having an active status and belonging to the first network and an interconnect node having an active status and belonging to the second network based on the respective status information assigned to the network interconnect nodes for the service, wherein each forwarding path only comprises two network interconnect nodes having an active status.

BRIEF DESCRIPTION OF THE DRAWINGS

In the following, the present disclosure will be described in more detail with reference to exemplary embodiments illustrated in the drawings, wherein FIG. 1: is a schematic block diagram illustrating an embodiment of a network;

FIG. 2: is a flow chart illustrating a method embodiment of establishing a forwarding path exiting a network;

FIG. 3: is a schematic block diagram illustrating an embodiment of a network system;

FIG. 4: is a flow chart illustrating a method embodiment of establishing a forwarding path within a network interconnect of a network system;

FIG. 13: is a schematic block diagram illustrating an embodiment of a network system;

FIG. 14: is a schematic block diagram illustrating a state of an embodiment of a network system;

FIG. 15: is a schematic block diagram illustrating a state of an embodiment of a network system;

FIG. 16: is a schematic block diagram illustrating a state of an embodiment of a network system;

FIG. 17: is a schematic block diagram illustrating an embodiment of a link priority assignment scheme;

FIG. 18: is a flow chart illustrating a method embodiment of a link priority assignment scheme;

DETAILED DESCRIPTION

Figure 5:
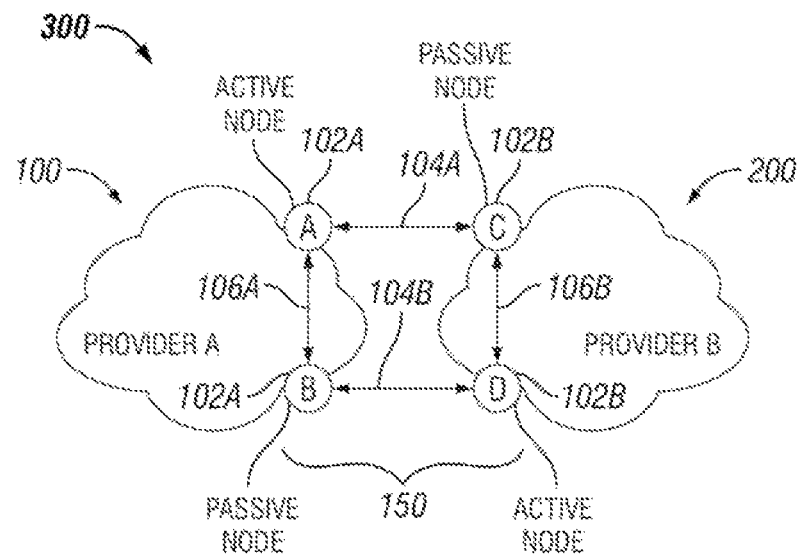
FIG. 5: is a schematic block diagram illustrating an embodiment of a network system.

In the following description, for purposes of explanation and not limitation, specific details are set forth, such as specific device, system and network configurations and specific methods, steps and functionalities, in order to provide a thorough understanding of the technique presented herein. It will be appreciated that this technique may be practiced in other embodiments that depart from these specific details.

Those skilled in the art will further appreciate that the methods, steps and functionalities described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique and in particular the network functionalities disclosed herein may be embodied in a processor and a memory coupled to the processor, wherein the memory stores one or more programs that perform the methods, steps and functions described herein when executed by the processor.

Any of the networks and network systems proposed herein may be based on the Ethernet standard or any other standard. The networks and network systems may comprise service interfaces compliant with the Provider Backbone Bridged Network (PBBN) standard and/or the External Network Network Interface (ENNI) standard (e.g., Phase 1, MEF 26). As an example, the service interfaces may compliant with so-called type III service interface definitions and controlled by L2GP.

FIG. 1 shows an embodiment of a network 100 comprising a plurality of network interconnect nodes 102 connectable to a plurality of external links 104 towards another network (not shown), and one or more internal links 106 connecting the network interconnect nodes 102 with each other. Although only two network interconnect nodes 102 are shown in FIG. 1, the network 100 may also comprise more than two network interconnect nodes 102.

The network 100 has functionality to carry out the following processes: for a given service, assigning interconnect node status information to the network interconnect nodes 102, wherein a network interconnect node 102 to which a passive status is assigned is only allowed to transmit service based data between an external link 104 and another network interconnect node 102, or between two other network interconnect nodes 102, and wherein only a network interconnect node 102 to which an active status is assigned is allowed to send or receive service based data to or from the network 100. The network 100 further has functionality to carry out the following processes: for a given service, determining an interconnect node 102 having an active status for establishment of a forwarding path including the interconnect node 102 having the active status and an external link 104, wherein the determination is based on the respective status information assigned to the network interconnect nodes 102 for the service.

In present context, the term "active status" or "passive status" of an interconnect node 102 indicates the role of the interconnect node 102 in the network interconnect 150 (e.g., in the sense of "for use" and "for backup"). The term does in general not indicate that the interconnect node 102 is operational or broken, or "up" or "down", unless used in that context for the purposes of monitoring and fault management.

The network 100 shown in FIG. 1 enables to select a forwarding path for a given service as shown in the flow chart of FIG. 2. In a first step 201, for a given service, interconnect node status information is assigned to the network interconnect nodes 102, wherein a network interconnect node 102 to which a passive status is assigned is only allowed to transmit service based data between an external link 104 and another network interconnect node 102 of the network 100, or between two other network interconnect nodes 102 of the network 100, and wherein only a network interconnect node 102 to which an active status is assigned is allowed to send or receive service based data to or from the network 100.

In a second step 202, for a given service, a network interconnect node 102 is determined having an active status for establishment of a forwarding path including the interconnect node 102 having the active status and an external link 104, wherein the determination is based on the respective status information assigned to the network interconnect nodes 102 for the service.

FIG. 3 shows a network system 300 comprising a first network 100 and a second network 200 being connected with each other by a network interconnect 150. The network interconnect 150 comprises a plurality of first network interconnect nodes 102A provided in the first network, a plurality of second network interconnect nodes 102B provided in the second network 200, a plurality of external links 104 connecting the first network interconnect nodes 102A with the second network interconnect nodes 102B, and one or more first internal links 106A connecting the first network interconnect nodes 102A and provided within the first network 100, and one or more second internal links 106B connecting the second network interconnect nodes 102B and provided within the second network 200.

The network system 300 further comprises functionality to carry out the following processes: for a given service, assigning interconnect node status information to the first network interconnect nodes 102A and to the second network interconnect nodes 102B, wherein a network interconnect node 102 to which a passive status is assigned is only allowed to transmit service based data between an external link 104 and another network interconnect node 102 of the network 100, 200 to which the network interconnect node 102 having the passive status belongs, or between two other interconnect nodes 102 of the network 100, 200 to which the network interconnect node 102 having the passive status belongs, and wherein only a network interconnect node 102 to which an active status is assigned is allowed to send or receive service based data to or from the network 100, 200 to which the network interconnect node 102 having the active status belongs.

The network system 300 further comprises functionality to carry out the following processes: for a given service, determining a forwarding path between a network interconnect node 102 having an active status and belonging to the first network 100 and a network interconnect node 102 having an active status and belonging to the second network 200 based on the respective status information assigned to the network interconnect nodes 102 for the service, wherein each forwarding path only comprises two network interconnect nodes 102 having an active status.

In the present context, the term "network system comprising a first network and a second network" includes the case that the first network and the second network are respectively only network parts (parts which are necessary to define the network interconnect), but not full networks in the common sense. Moreover, it will be appreciated that the network system may also comprise more than two networks (or network parts).

The network system 300 shown in FIG. 3 enables to select a forwarding path for a given service as shown in the flow chart of FIG. 4. In a first step 401, for a given service, interconnect node status information is assigned to the first network interconnect nodes 102A and to the second network interconnect nodes 102B, wherein a network interconnect node 102 to which a passive status is assigned is only allowed to transmit service based data between an external link 104 and another network interconnect node 102 of the network 100, 200 to which the network interconnect node 102 having the passive status belongs, or between two other network interconnect nodes 102 of the network 100, 200 to which the network interconnect node 102 having the passive status belongs, and wherein only a network interconnect node 102 to which an active status is assigned is allowed to send or receive service based data to or from the network 100, 200 to which the network interconnect node 102 having the active status belongs.

In a second step 402, for a given service, a forwarding path between a network interconnect node 102 having an active status and belonging to the first network 100 and a network interconnect node 102 having an active status and belonging to the second network 200 is determined based on the respective status information assigned to the network interconnect nodes 102 for the service, wherein each forwarding path only comprises two network interconnect nodes 102 having an active status.

In the following description, the networks 100, 200 may also be denoted as "provider networks". As understood herein, a provider is an entity in charge of operating a particular network.

The embodiments described herein provide functionality needed to operate a network system like a node redundant (e.g., Ethernet-based) network interconnect that may fulfill one or both of the following requirements: A) A fault of a network interconnect link or node does not lead to state changes in the provider networks; B) Providers (i.e., operators of the networks 100, 200) are able to set their network interconnect node preferences per service independently of each other.

As shown in FIG. 3, the simplest network interconnect topology that is able to support the above requirements is a 4-node ring. Thus, the following discussion relates to embodiments which operate a network interconnect like an Ethernet network interconnect based on a 4-node ring topology. Of course, the embodiments disclosed in the following may also be applied to networks having an arbitrary number of nodes and internal/external links.

In the following, embodiments comprising functionality for active node picking, working and backup path control, and network interconnect monitoring will be discussed in more detail. These embodiments may be implemented by the network 100 of FIG. 1, the network system 300 of FIG. 3, or any other network system.

According to an embodiment, each provider may select one active network interconnect node 102 for each service effecting that the other network interconnect nodes 102 of the provider become passive. FIG. 5 shows an example of such a selection. The active network interconnect nodes 102 (nodes A and D in the example shown in FIG. 5) are allowed to forward frames between the network interconnect 150 and the attached provider network. That is, node A is allowed to forward frames between the network interconnect 150 and the attached provider network 100, and node D is allowed to forward frames between the network interconnect 150 and the attached provider network 200. Passive network interconnect nodes 102 are not allowed to forward frames between the network interconnect 150 and the attached provider network. In this way, loops can be avoided.

The network interconnect nodes 102 establish a loop free working path and a loop free protection path for each service. The working and protection paths are determined based on the (active/passive) status of the network interconnect nodes 102 of both provider networks 100, 200 with respect to the given service and based on coordinated external network interconnect link priority configuration. The coordination is between the two provider networks 100, 200.

Figure 6:
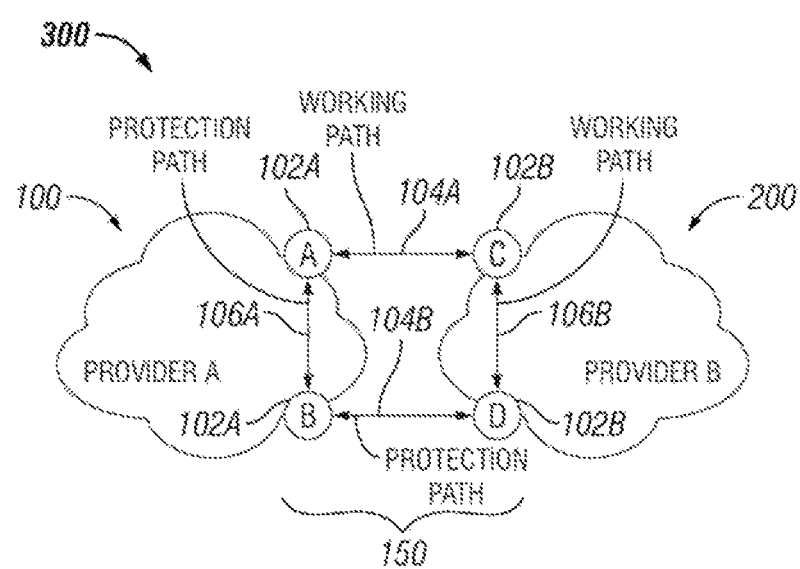
FIG. 6: is a schematic block diagram illustrating an embodiment of a network system.

FIG. 6 shows an example of a selection of a working path and a protection path for a service. For a given service, the assigned working path is the forwarding path for the service having the highest priority. For a given service, the assigned protection paths are the forwarding paths for the service having lower priorities.

The active network interconnect nodes (nodes A and D in FIGS. 5 and 6) 102 are allowed to forward frames between the network interconnect 150 and the attached provider network. Furthermore, the active network interconnect nodes 102 switch between working and protection paths based on the availability of the paths. Passive network interconnect nodes 102 (nodes B and C in FIGS. 5 and 6) are not allowed to forward frames between the network interconnect 150 and the attached provider network. On the other hand, passive network interconnect nodes 102 are allowed to forward frames between network interconnect links 104, 106.

Figure 7:
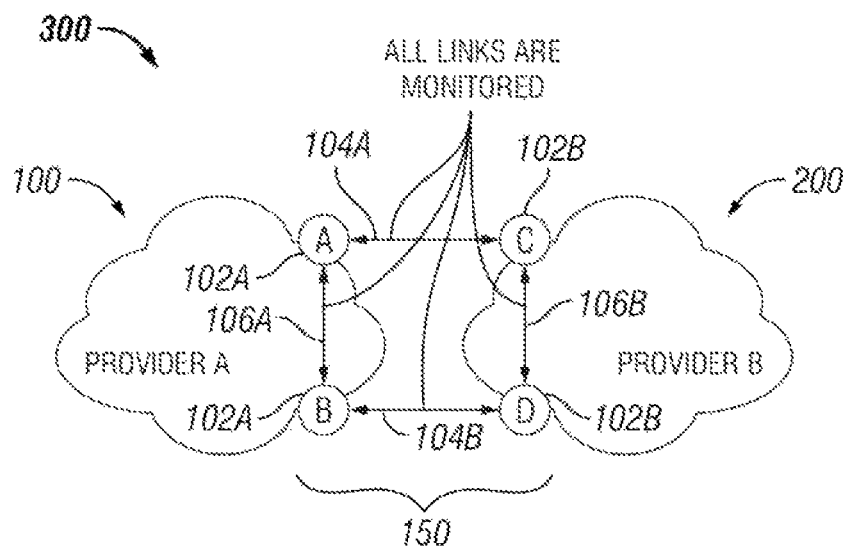
FIG. 7: is a schematic block diagram illustrating an embodiment of a network system.
Figure 8:
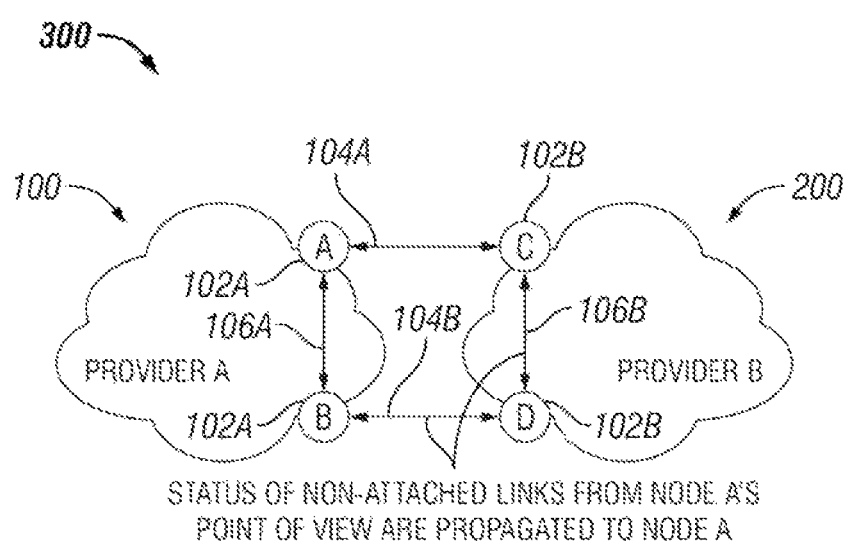
FIG. 8: is a schematic block diagram illustrating an embodiment of a network system.

The status of all network interconnect links 104, 106, be it physical or virtual, may be monitored, as shown in FIG. 7. To supervise longer network interconnect paths (2-hop paths in a 4-node ring), the status information of non-attached links may be propagated to non-attached network interconnect nodes. This situation is illustrated in FIG. 8. In the example shown in FIG. 8, status information of the links 104B and 106B (indicated by bold arrows) that are not directly connected to network interconnect node A are propagated to network interconnect node A.

It should be noted that the propagation of the status information of link 106B to node A is optional. In case of a Virtual Node solution as discussed below in more detail the status information may not be propagated (because the existence of that link is hidden to node A). Nevertheless, the status information could in certain cases also be propagated in a Virtual Node solution.

Each provider network 100, 200 may run an own active node picking protocol. This protocol may be run on the network interconnect nodes 102 of the provider networks 100, 200. Alternatively or optionally, this protocol may be integrated into a routing protocol of the provider network 100, 200. The active node picking protocol ensures that one network interconnect node 102 is selected to be active per service. The other network interconnect nodes 102 of the provider network 100, 200 become passive. The selection may be based on preconfigured network interconnect node priorities.

Figure 9:
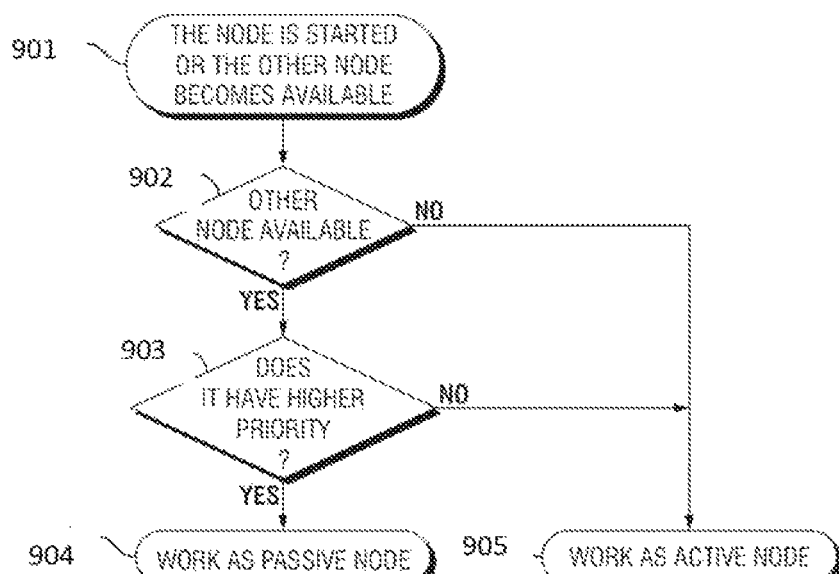
FIG. 9: is a flow chart illustrating a method embodiment of active node picking.

A flow chart of an embodiment of an active node picking process according to the active node picking protocol is shown in the flow chart of FIG. 9. The active node picking process is triggered in step 901 in a particular network interconnect node 102 when the particular network interconnect node 102 is started or when it is determined that a further network interconnect node 102 becomes available. In step 902 it is determined whether a further network interconnect node 102 has become available. If a further network interconnect node 102 has not become available, then the particular network interconnect node 102 is determined at step 905 to be the active network interconnect node. If a further network interconnect node 102 has become available, then it is determined at step 903 whether the further network interconnect node 102 has a higher priority than the particular network interconnect node 102. If "no", then the particular network interconnect node 102 is determined at step 905 to be the active network interconnect node. If "yes", then it is determined at step 904 that the particular network interconnect node 102 is a passive network interconnect node.

If an active network interconnect node 102 fails, active node picking may select another network interconnect node 102 of the same provider network 100, 200 (i.e., a passive active network interconnect node 102 becomes active). Selecting an active network interconnect node 102 is done per service.

The network interconnect nodes 102 that participate in active node picking may communicate over the provider network 100, 200 they belong to. In addition, the network interconnect nodes 102 that participate in active node picking may also communicate over the network interconnect 150.

According to an embodiment, working and backup path control functionality may be used which defines the forwarding behavior of the network interconnect nodes 102. Working and protection path control may define different paths per service (i.e., may work on a per service basis).

On a 4-node ring topology as shown in FIG. 3, the working/protection paths control may use the following information as input (all of the input parameters may be different per service): The role of the interconnect nodes 102 of the local provider 100, 200, i.e., if the interconnect nodes 102 itself are active or passive; the role of the interconnect nodes 102 of the peer provider, i.e., if its neighbor interconnect nodes 102 connected by the external network interconnect link 104 are active or passive; and external network interconnect link priority.

The working path stretches between the two active network interconnect nodes 102 and it crosses the higher (highest) priority external link 104 connecting the networks 100, 200. The backup path extends between the two active network interconnect nodes 102 and it incorporates the lower (lowest) priority external link 104 connecting the networks 100, 200. Active nodes 102 forward frames between the network interconnect 150 and the attached provider network 100, 200 (i.e., the network to which the active network interconnect node 102 belongs). Active nodes 102 forward the frames to the working paths if the corresponding path is available. Otherwise, they forward the frames to the protection path. Passive nodes 102 do not forward frames between the network interconnect 150 and the provider network 100, 200. On the other hand, they forward frames between different network interconnect ports.

Figure 10:
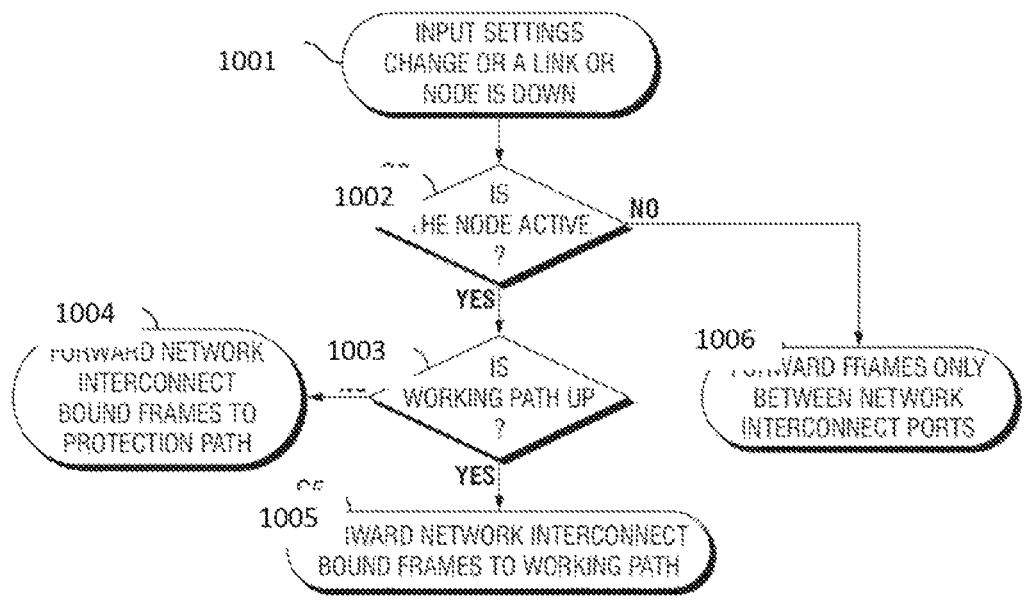
FIG. 10: is a flow chart illustrating a method embodiment of forwarding path picking.

The flow chart of an embodiment of a working and protection path control is shown in FIG. 10. The working and protection path control process is triggered in step 1001 (e.g. in a particular network interconnect node 102) if input settings (like active/passive status information settings) change or if a network interconnect node 102 goes down. It is determined at step 1002 if the network interconnect node 102 is active. If it is not active, then it is determined at step 1006 to forward network interconnect bound frames only between network interconnect ports. If it is active, then it is determined at step 1003 whether the working path is up. If the working path is up, then it is determined at step 1005 to forward the network interconnect bound frames to the working path. If the working path is down, then it is determined at step 1004 to forward the network interconnect bound frames to the protection path.

Network interconnect nodes 102 may discover their active/passive status via active node picking. In this regard, active/passive node selection information may be propagated to the peer provider's network interconnect nodes 102. For example, notification messages may be used to notify the peer provider's network interconnect nodes 102 if the active/passive status of the network interconnect nodes 102 change.

The priorities of the external links 104 connecting the networks 100, 200 may be coordinated between providers and configured in all network interconnect nodes 102. The link priority in a 4-node ring maybe of Boolean type indicating if the external network interconnect link 104 is preferred or not.

All network interconnect nodes 102 may gather status information of directly attached links 104, 106 and of non-attached links 104, 106. The status of attached links 104, 106 may be monitored by means of using an existing link monitoring solution, for example by CCM (Continuity Check Message) messages. The status information of non-directly attached links 104, 106 may be propagated to non-attached nodes 102 by some means. For example if CCM is used for the monitoring of the attached links 104, 106, then by adding a new TLV (Type Length Value) to CCM messages with the status information of the other attached link 104, 106 of the sender network interconnect node 102.

A fault may trigger the redirection of traffic from the working path to the protection path. The breakdown of the directly attached link 104, 106 is detected by the link monitoring used, whereas network interconnect nodes 102 become aware of the breakdown of a non-attached link 104, 106 based on propagated information they receive.

Figure 11:
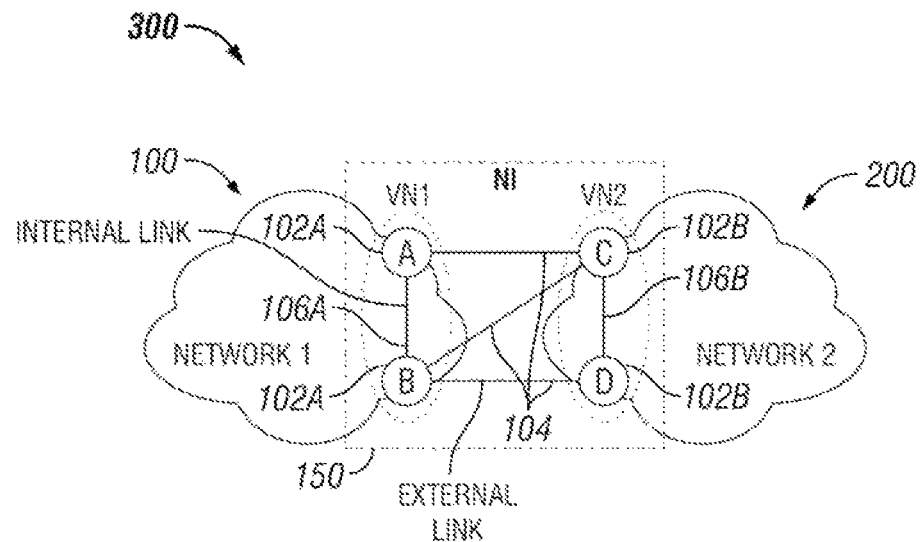
FIG. 11: is a schematic block diagram illustrating an embodiment of a network system.

FIG. 11 illustrates a networking scenario of a network system 300. In this embodiment, two networks 100, 200 are connected to an arbitrary number of external links 104. The Network Interconnect (NI) 150 comprises the external links 104, the nodes 102 attached to the external links 104, and the internal links 106 connecting the nodes 102 of the same network 100, 200. The nodes 102 belonging to the same network 100, 200 may form an entity referred to as Virtual Node (VN) if the internal links 106 and the nodes 102 forming the VN are hidden from the peering network 100, 200, i.e. if the peering network 100, 200 perceives the VN as a single device. In this case, the nodes A and B may form a first virtual node VN1, and the nodes C and D may form a second virtual node VN2.

According to a possible implementation, one or more of the following functionalities are used in order to make the NI 150 operational and fault tolerant:

A) Picking for the selection of the active node 102 and of the active external link 104 for providing loop and duplicate free connectivity for a particular service. Picking also takes part in handling of certain failures.

B) Auto-provisioning for providing default operation parameters for service delivery and traffic distribution on the external links 104 if a predetermined configuration is missing.

C) Monitoring to detect failure events.

D) Fault management to handle failure events.

The functionalities of the technique described herein may also be applicable in a more generic scenario (e.g., when VN information is not hidden).

Figure 12:
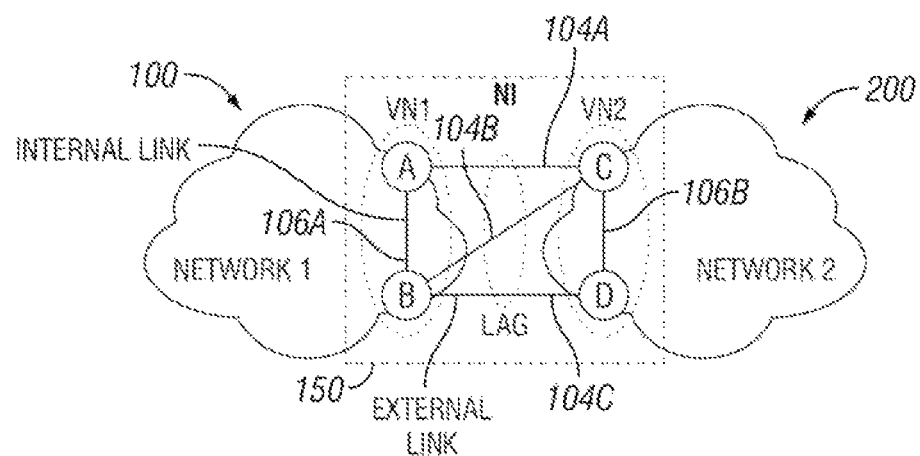
FIG. 12: is a schematic block diagram illustrating an embodiment of a network system.

As shown in FIG. 11, in an embodiment, the nodes 102 belonging to the same network 100, 200 may form a VN. The connection between the nodes comprising a VN is referred to as internal link 106. The VNs are then connected by external links 104 thus connecting the two networks 100, 200. The external links 104 may form a Link Aggregation Group (LAG) as illustrated in FIG. 12. The VN based approach implies that the VNs run their control independently of each other and hide VN internal information from the peering network 100, 200. Nonetheless, they provide a standard interface towards each other (i.e., exchange standard frames on the external links 104).

The VN internal control may be the same in the VNs of different networks. FIG. 11 only shows two-node VNs, however, a VN comprise of more than two nodes 102 and corresponding internal links 106.

Within the NI 150, two forwarding principles may be applied: The forwarding is congruent if the forward and backward paths are the same for a given service. Otherwise the forwarding is non-congruent. In the following description, functionalities required for the operation of the NI 150 will be described first, then their possible implementation will be discussed. Picking functionality will be described first.

According to an exemplary realization, the NI 150 has to provide loop and duplicate free frame delivery. That is, a single copy of a frame sent by a network 100, 200 should be received by the peering network 100, 200. Furthermore, a frame sent by a network 100, 200 to the NI 150 for the transmission to the peering network 100, 200 should not be sent back to the originator network 100, 200. In addition to this, the loop free forwarding has to be ensured within the NI 150.

According to one variant, a so-called picking functionality in order to implement loop and duplicate free forwarding is provided, which may be run by both networks 100, 200 independently of each other. Picking selects a single active NI node 102 of a provider 100, 200 for a particular service. In addition to this, a single active port of the active node 102 towards the attached network 100, 200 is selected, furthermore, a single external link 104 (thus a corresponding single active port) is selected by the picking for the given service. Further configurations may be used by the picking depending on the result of the selections and the forwarding scheme applied.

FIG. 13 illustrates an example of a result of an active node selection. In order to provide loop prevention, the active NI nodes 102 (nodes A and D in the example of FIG. 13) are allowed to forward frames between the NI 150 and the corresponding attached network 100, 200. As opposed to this, passive NI nodes 102 (nodes B and C in the example of FIG. 13) are not allowed to forward frames between the NI 150 and the corresponding attached network 100, 200.

The picking of the active node 102 may be performed based on the operator's "service to NI node" assignment, which may be implemented by configuration (e.g., per service node and/or link priorities may be configured). Picking selects the highest priority node 102 as active node for a particular service, and all the other nodes 102 are passive ones. Auto-provisioning may be performed by the picking if operator configuration is lacking. If there are configured priority values, then the node picking may be always performed only based on the node priorities configured by an operator 100, 200 on its own nodes 102. The flowchart of the per service active node picking method is shown in FIG. 9. This picking functionality may be implemented in a so called picking protocol (e.g., the nodes 102 exchange the priority information in Packet Data Units, or PDUs, and then each makes an individual decision consistent to the other nodes decisions. These PDUs are exchanged within the network 100, 200 the nodes 102 belong to.

The external link picking method may depend on the service type (i.e., whether or not it is congruent). Only the outbound external link 104 has to be selected by the link picking for a non-congruent service. If the active node 102 has a single external link 104, then there is no choice, the single link is the outbound link 104. If the active node 102 has multiple external links 104, then the picking selects the one having the highest priority as the outbound link 104. As opposed to this, the inbound and the outbound link 104 are the same for a congruent service, which can only be ensured if the external link priorities are coordinated by some means. The link picking may simply select the highest priority external link 104 for a particular congruent service.

Failures may be handled by the picking protocol as re-picking is performed if a link 104, 106 or node 102 goes down, which is described later on in detail. Re-picking may always be performed such that the active node 102, link 104, 106, or port is set to passive first, and the new active one is only set active afterwards.

The forwarding rules may be (slightly) different for congruent and non-congruent services, as will now be discussed in more detail.

For a congruent service, the inbound and the outbound external link 104 is the same, thus the same port is active at the active node 102 for both the incoming and outgoing external traffic. Therefore, an active port has no direction, i.e., it is active for both directions in case of a congruent service. During the picking, each provider selects its highest priority NI node 102 to be the active one and all the others to be the passive ones. Based on the coordinated priorities, picking then selects the highest priority available external link 104 for the service, which will be the single active external link 104.

FIG. 14 shows an example of a result of the picking for a congruent service. Node A is the active node 102 for the first network 100 and Node D is the active node 102 for the second network 200. The external link 104A had higher priority than the other external links 1046, 104C, therefore, external link 104A was selected by the picking as the active link. Due to the result of the picking, Node C needs to transmit the traffic between Nodes A and D. Node C is aware of external link priorities and is able to forward frames to the NI node 102 attached to the external link 104A with the highest priority. In general, a passive node can only transmit traffic between an external link 104 and another NI node 102, but never between an external link 104 and the attached network 100, 200. If an active node 102 is directly attached to the active external link 104, like Node A in the example, then the active node 102 bridges frames between the NI 150 and the network 100, 200. If the active node 102 is not connected directly to the active external link 104, like Node D in the example, then it forwards frames between the attached network 100, 200 and the passive node 102 attached to the active link (Node C in the example).

The coordinated link priority does not imply coordination on the node priority, which is also illustrated in FIG. 14. That is, the network operator may prefer any NI node 102 for a service, independently of the coordinated link priority thus independently of the peering network 100, 200.

For a non-congruent service, the inbound and outbound links 104 may be different. In this case, each network 100, 200 may only select its outbound link 104 thus its outbound port, but accept any inbound link 104 chosen by the peering network 100, 200, which is the outbound link 104 of the peering network 100, 200. Therefore, the incoming traffic must be accepted in each port. During the picking, each provider 100, 200 may select its highest priority NI node 102 as the active one and all the others are passive ones. Picking may then select the highest priority available external link 104 connected to the active node 102 as the outbound link 104 for the service.

FIG. 15 shows an example of a result of the picking for a non-congruent service. Due to the fact that the frame traffic is directed, the ports are directed as shown by the arrows in FIG. 15.

In the example shown in FIG. 15, network 100 picks Node A as active node, which implies the use of the external link 104A for outbound traffic. Network 200 picks Node D, which implies the use of the external link 104C for the outbound traffic. However, the passive nodes B and C have to accept the incoming traffic at all their external ports and direct it towards the active node 102 as shown by the arrows of the ports. In general, the passive nodes 102 send the frames received from an external link 104 to the active node 102. The active node

102 sends the frames received from the network 100, 200 to its outbound link 104 and sends the frames received either from an external link 104 or from a passive node 102 to the network 100, 200. In addition, the active nodes 102 may implement a split horizon (i.e., they can only forward the frames received by a passive node 102 towards the attached network 100, 200 but not towards any external link 104).

Thus, the result of the picking and the actions to be taken in order to implement the result of the picking may depend on the forwarding approach applied, i.e. whether or not it is congruent. Picking is a general functionality needed in an NI 150. It is independent of whether or not the VN concept is used.

Services may be grouped into bundles. Bundling may in particular be used if simplification can be achieved, hence bundles might be used to:

A) Reduce the amount of signaling needed, i.e. an outbound link is signaled per bundle instead of per service;
B) Reduce the number of events to be managed after a fault is detected (e.g., fault management is per bundle instead of per service;
C) Reduce the amount of configuration needed, i.e. link priority list is configured per bundle instead of per service;
D) Reduce the number of forwarding entries (e.g., forwarding is per bundle instead of per service).

It may be distinguished between two types of bundling:
A) Data plane bundling in order to simplify forwarding; data plane bundling is reflected in each frame and forwarding decisions are made based on a bundle ID instead based on service IDs;
B) Control plane bundling in order to simplify the control (configuration, signaling, fault management); control plane bundling does not appear in data frames but control plane decisions are made based on the bundle ID instead based on service IDs.

The granularity of the bundling may be determined by considering the most complex failure event, when the data connection between the NI nodes 102 belonging to the same network 100, 200 goes down, as shown in FIG. 16. In the example shown in FIG. 16, the C-D link 106B goes down. As the internal link 106B belongs to network 200, it is acceptable if the owner of network 200 reacts to this failure and handles it if possible and does not influence the unaffected network 100. Therefore, the owner network 200 may protect the internal link 106B using restoration or protection mechanisms available in the owner network 200 and/or may move the affected services from node D to node C.

The useful bundling granularity may be determined exactly as the set of affected services in such a failure scenario. In the example shown in FIG. 16, the reaction is performed on those services that are received by node C and destined to node D. Node C has to become the active node for these services and Node D has to become the passive one.

Bundling should be applied on services carried over the same external link 104 and destined to the same NI node 102. Bundling can be both control plane and data plane bundling for congruent services. It may not be that straightforward for non-congruent services due to the more complex forwarding. Control plane bundling can also be used for non-congruent services. Nonetheless, the use of data plane bundling may depend on whether the implementation provides the features to maintain the forwarding rules for bundles.

According to an exemplary embodiment, auto provisioning is performed. Auto-provisioning performs default assignments if configuration is lacking. It is the task of auto-provisioning to provide input for the picking if priorities had not been configured. The input for the auto-provisioning may be a Service ID, and there may be further inputs. According to one embodiment, the auto-provisioning is slightly different for congruent and non-congruent services, therefore they are discussed independently of each other in the following. Each service may be treated as non-congruent by default; in this case, it has to be configured (e.g., by setting a flag, that a service is congruent). The auto-provisioning method may be applied in each network 100, 200 independently of the other one without any signaling between the networks 100, 200. Manual override of auto-provisioning results may be possible by a network operator. In this case, picking may operate on the manually configured values. For congruent services, manual overrides should always be coordinated.

Since congruent services have to be carried over the same external link 104, the main task of auto-provisioning may be configured to determine the external link priorities for a service. In order to be able to support bundling for services carried over the same external link 104 as the working path, the external link priorities have to be the same for the services grouped in a bundle. That is, the working path and the order of backup paths have to be the same. Therefore, the backup link priorities should be fixed for each working path. That is, auto-provisioning has to determine which one is the highest priority external link for a particular service, i.e., the working path which implies the backup link priorities. Thus, the auto-provisioning methods running independently of each other in the two networks 100, 200 have to produce the same external link priorities for a particular service. Therefore, the priorities have to be determined based on some data available for both networks 100, 200 connected by the NI 150. If some means for monitoring is implemented for the external links 104, the two networks 100, 200 at least exchange monitoring PDUs thus obtain some information from the peering network 100, 200, which can be the basis of priority selection. If LAG is used to group the external links 104, then the LAG ID and the Link IDs are available to both networks 100, 200. The Link ID is comprised of the ID of the ports the link 104 connects. It unambiguously identifies the link 104 in the scenarios LAG was originally designed for, which is grouping links connecting two nodes 102, because two ports always have different port IDs within a node 102. However, if multiple nodes 102 claim to be the same system, i.e. a virtual node VN, as in the case of an NI 150, then unique port IDs should be used within the virtual node VN.

The first task may be to determine the backup priorities for the external links 104, which may be done independently of any service to link or node assignment. According to an embodiment, the aim of backup link priority assignment is to provide an even utilization (e.g., use all links the same amount of times as highest priority backup, secondary backup, etc.). In order to achieve this, a simple method may be used determining backup link priorities based on the link IDs, which is illustrated in FIG. 17 for the example of six external links.

As can be derived from FIG. 17, first, the external links 104 are sorted in lexicographic order as shown by the leftmost column. The backup priorities are then determined for each link 104. A simple and transparent approach is to keep the lexicographical order and apply some shifting, which is 1 in this example. That is, for a link 104, the highest priority backup link is the next one in the lexicographic order and further backup priorities are also assigned according to the lexicographic order. For instance, if $link_3$ is the working path, then $link_4$ is the highest priority backup and $link_5$, $link_6$, $link_1$, $link_2$ are the consecutive ones.

The link 104 for the working path may be selected by the auto-provisioning algorithm for each congruent service lacking configuration. The auto-provisioning method may run independently of each other in the two networks 100, 200. However, both instances of the auto-provisioning have to select the same external link 104 for a particular service, therefore, the method has to rely on data available for both networks 100, 200. Thus, according to one embodiment, the Service ID applied within the NI, the link IDs and the number of external links denoted by n may be used. The following approach as shown in FIG. 18 may be used to distribute the traffic on the external links 104:

Compute the Service ID modulo the number of external links 104, which is denoted by m=Service ID mod n. Then select the m-th external link from the lexicographically sorted list of Link IDs. The entire external link priority list is then given for the service: the m-th link has the highest priority, this is the working path link and all the other priorities are determined by the backup priority list belonging to the m-th link. If the above described backup priority list assignment approach is applied with the shifting value of 1, then the external link priority assignment method can be summarized as illustrated in FIG. 18: In step 1801, the method is started. In step 1802, the links are sorted in lexicographic order along their Links IDs. In step 1803, m:=Service ID mod number of external links is determined. In step 1804, the highest priority is assigned to the m-th link and the other priorities to the other links according to their lexicographical order. In step 1805, the method is terminated.

That is, the lexicographically sorted list of link IDs determines the link priority list, and the highest priority link 104 is determined by a modulo operation. If a service should not be carried over a specific external link 104, then its priority value should be set to NULL for that particular service.

The forwarding within the NI 150 is the most efficient if the nodes 102 directly attached to the highest priority external link 104 are the active ones. Therefore, the following auto-provisioning method for the assignment of node priorities is proposed: use the external link priority determined for a particular service as the priority of the node 102 attached to the external link 104. If there are multiple external links 104 attached to the same node 102, then the highest priority value should be used.

If bundling is used, then the auto-provisioning may assign the Bundle IDs as well. As described above, a bundle is determined by the external link 104 used for a service and the destination node 102 in the own network 100, 200. It is assumed that the unused Bundle IDs are stored in a bundle pool. The number of Bundle IDs required can be determined by summing up for each external link 104 the different destinations for the services carried on that particular external link 104. The following Bundle ID assignment auto-provisioning method may be used: assign Bundle IDs for a service according to the external link priority, then assign the destination node priority values in increasing order from the pool of the free Bundle IDs.

The node priority list and then the priority list of external links 104 connected to the same node 102 if there are multiple may be determined by the auto-provisioning method for non-congruent services because they determine the outbound link 104 used for the service.

Figure 19:
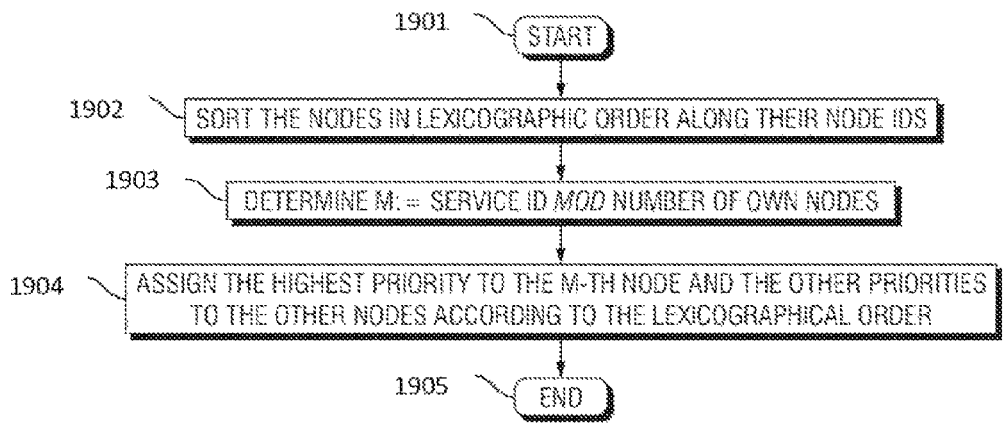
FIG. 19: is a flow chart illustrating a method embodiment of a node priority assignment scheme.

For assigning node priorities for non-congruent services, the algorithm used for external link priority assignment for congruent services may be reused (FIG. 18) in order to simplify implementation. FIG. 19 shows an example of such an algorithm: In step 1901, the method is started. In step 1902, the own nodes 102 are sorted in lexicographical order according to their node IDs. In step 1903, m is determined, which is Service ID modulo number of own nodes 102. In step 1904, the highest priority is then assigned to the m-th node 102, and the priority of further nodes 102 is assigned according to their lexicographical order. In step 1905, the method is terminated.

Figure 20:
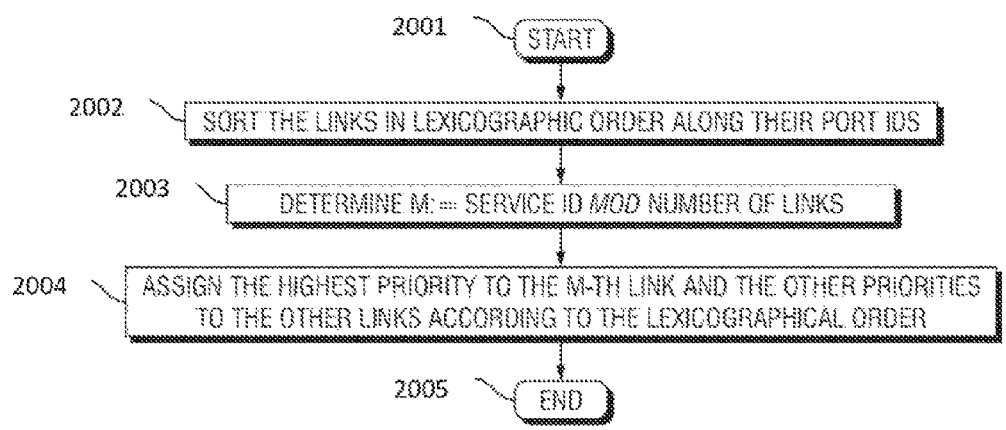
FIG. 20: is a flow chart illustrating a method embodiment of a link priority assignment scheme.

In this way, priority assignment is finished for nodes 102 having a single external link 104 attached. However, the multiple external links 104 attached to the same node require a further priority list. This may be determined node by node. FIG. 20 shows an example of such an algorithm: In step 2001, the method is started. In step 2002, the external links 104 connected to the same own node 102 are sorted in lexicographic order according to their Port ID within the own node 102. In step 2003, m is determined as the Service ID modulo the number of external links 104 connected to the given node 102. In step 2004, the highest priority is assigned to the m-th link 104 and further priorities are assigned according to their lexicographical order. In step 2005, the method is terminated.

The node priorities may have precedence over link priorities for non-congruent services, which should be the case for Configured values as well. That is, it is not allowed to have the highest priority outbound link 104 attached to e.g. node A, the second highest to node B, and the third highest to node A again. In this example, both links of node A have higher outbound priority than that of the link 104 attached to node B because node A has higher priority than node B.

If bundling is used, then the Service ID to Bundle ID assignments may have to be coordinated between the networks 100, 200, otherwise the Bundle ID may not be used for fault handling. Therefore, the first task of auto-provisioning may be the Service ID to Bundle ID assignment if bundling is used for non-congruent services. The following method may be used for this assignment: Maintain a pool of the Bundle IDs. (Note that this indicates the number of bundles desired to be used in the NI.) Then determine the Service ID modulo number of bundles (b), and denote it c. Then assign the c-th Bundle ID to the Service ID. If the c-th bundle ID is not free but it is already in use, then determine the Service ID modulo b−i, where i=1 . . . b−1, until an unused bundle ID is found.

If bundling is used, then the node priority assignment method may be the same as depicted in FIG. 19, and the external link priority assignment may be the same as shown in FIG. 20, but the Bundle ID is used instead of the Service ID.

Figure 21:
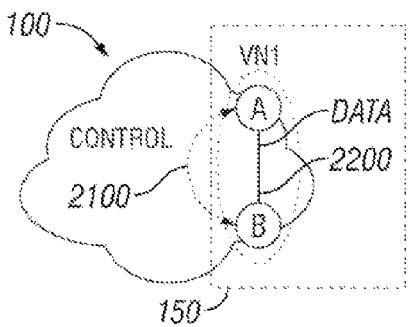
FIG. 21: is a schematic block diagram illustrating an embodiment of a network system.

The NI nodes 102 belonging to the same network 100, 200 have to exchange control messages and maybe data frames as well. In order to improve the survivability of the solution the control and data traffic may be split. Protection may be provided for both of them independently of each other. Better protection is provided for the control traffic. An example of a separation is illustrated in FIG. 21. In FIG. 21, between nodes A and B, a first internal link 2100 is used for the control data traffic, and a second link 2200 is used for the content data traffic.

Splitting has several advantages. If the content data link goes down, then the control data link may still be alive, thus link and node failure events can be separated. Furthermore, the worst failure scenario, which is referred to as split brain, when these nodes cannot communicate to each other, is less likely to happen as it can be only caused by multiple failures. Two failure events are distinguished. It is the split brain scenario if the internal connection used for the control traffic breaks. However, if the content data link goes down only but the control data link is available, then that is an internal link failure.

All external and internal links may be monitored once per link regardless of the fact if the links are physical or virtual. That is, the control and data plane connections within a virtual node may be monitored as well, independently of each other. Instead of a per service monitoring, link level monitoring may be applied.

The link monitoring may be done using CCM messages. Alternatively, external links 104 may be monitored using LACPDUs.

The key attribute of a VN based NI 150 is that it hides VN internal information (e.g., internal link status) from the peering network 100, 200. There are multiple alternatives for the operation of such an NI 150 based on the different coordination and signaling approaches used. In addition to this, the failure of the VN internal link 106 may be handled in a different way. The alternatives are the following. An internal link failure may be handled for all services exactly the same way or per service differentiation might be applied. The forwarding principle applied may be either congruent or non-congruent for a service. The external link priorities may either be coordinated or not, signaling may be applied if they are not coordinated. If bundling is applied, then the bundling may either be coordinated or not.

That is, according to exemplary embodiments, the following three solution alternatives may be used:

1. Common handling: In this embodiment, there is no per service differentiation if the VN internal link 106 goes down. This is the simplest approach. There is neither signaling nor coordination between the attached networks 100, 200. Therefore, the forwarding is basically non-congruent in this embodiment. Due to the lack of coordination it is only accidentally congruent. The advantage of this embodiment is that the recovery actions do not depend on each other and there is no signaling on the external links 104.

2. Congruent handling: Congruent forwarding and coordinated link priorities are applied in this embodiment, but the bundles are not coordinated if any and there is no need for signaling between the two networks 100, 200. Coordination of external link priorities is essential for congruent services. Bundles are not needed to be coordinated as the possibility for bundling is implied by the coordinated external link priorities.

3. Non-congruent handling: Non-congruent forwarding is used in this embodiment. The bundles have to be coordinated if any otherwise a bundle cannot be interpreted and all actions have to be done per service. Link priorities do not have to be coordinated for non-congruent services, but the outbound link selection has to be signaled to the peering operator 100, 200 for proper failure handling.

The following table summarizes these options.

|  | Coordinated external link priority | Coordinated bundle | Signaling of outbound link |
| --- | --- | --- | --- |
| Common | No | No | No |
| Congruent | Yes | No | No |
| Non-congruent | No | Yes | Yes |

The differences between the options are in their operation as described in detail below. Specifically, the reaction to a fault may be different in the different options. Therefore, their operation is described in detail along the fault management applied.

According to one embodiment, external link failure should not cause any state change in any of the attached networks 100, 200 if possible. Therefore, the nodes 102 selected by the picking are kept. There is no change in either side in any of the solution options.

Figure 22:
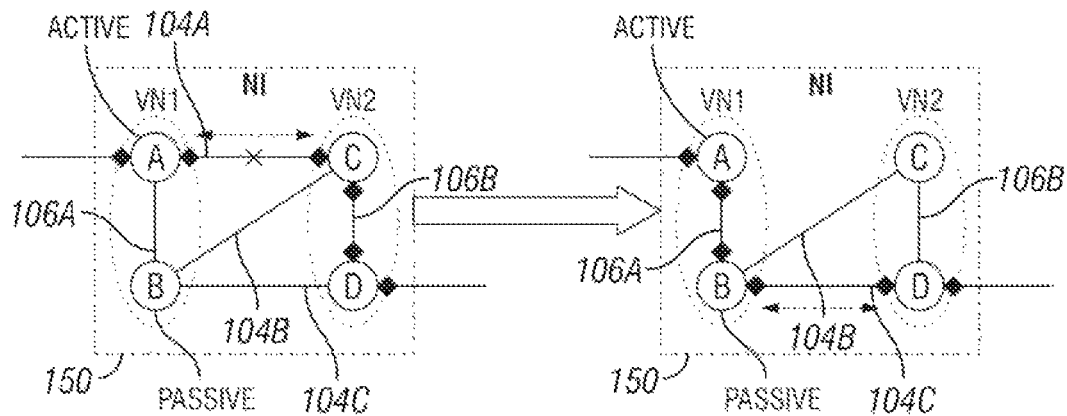
FIG. 22: is a schematic block diagram illustrating an embodiment of an external link failure handling in a network system.
Figure 23:
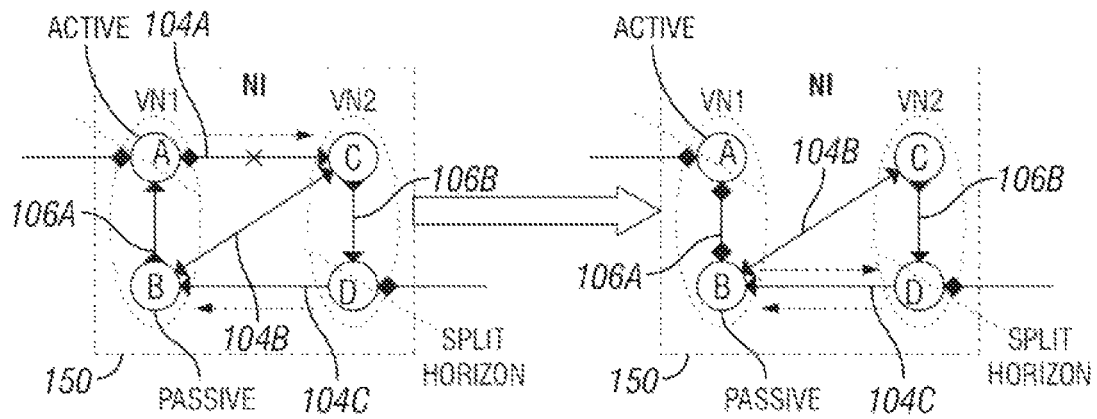
FIG. 23: is a schematic block diagram illustrating an embodiment of an external link failure handling in a network system.

The operation is the same for all the three solution alternatives described above. In order to handle the failure, the highest priority available external link 104 is selected for carrying the traffic and the NI node ports are updated according the new external link selection. Thus frames are redirected to the new external link 104. Frames received from the new external link 104 are sent to the active node 102, which is the same as it was before the failure. The redirection to the new external link 104 may be performed per bundle if bundles are maintained, alternatively it may be done per service. The operation of forwarding may be the same as described above both for congruent and non-congruent services. The external link failure handling for the two types of services is illustrated by the examples shown in FIG. 22 and FIG. 23.

As the fault is handled by the re-picking of the external link 104, it is the task of the picking protocol to handle this type of failure. There is no race condition between link and node failures, because the network 100, 200 that cannot decide whether it is a link or a peering node failure reacts the same way to both of them anyway.

In case of a node failure, the peer network's recovery actions are the same as in case of an external link failure thus the operation is the same for all three solution options. If a node 102 fails, the owner network 100, 200 of the node 102 performs the picking (referred to as re-picking). Thus, the highest priority available node 102 and the highest priority available links 104, 106 are selected. The peering provider 100, 200 only reselects the external link 104. In case of a congruent service, the networks 100, 200 select the same highest priority external link 104 again for a particular service. Services may be handled individually or in a bundle in reaction to a node failure. The handling of this fault is also a re-picking thus it may be performed by the picking protocol.

There is a race condition between the node 102 and internal link failures. According to an embodiment, this is addressed by splitting the control plane and data plane traffic inside the VN, taking different physical paths and monitoring independently, i.e., node failure is indicated if both the control and data plane paths are unavailable.

In case of an internal link failure, only the data connection between the NI nodes 102 of the same network 100, 200 goes down, but the control connection remains available. (If the control channel goes down, then a split brain scenario appears.)

A key characteristic of the VN concept is that it hides the VN internal details from the peering network 100, 200. Therefore, if a VN internal failure happens, then the VN may resolve it if possible and should not rely on recovery actions from the peering VN. The failure might be resolved by re-picking.

The recovery actions are different for the three solution alternatives as described above, therefore, they are discussed individually. Nonetheless, a common feature is that some sort of re-picking is applied to handle the fault, that is, the picking protocol handles the failure.

The simplest handling of the breakdown of an internal link 106 is when all services are moved to a single common node 102 and all other nodes 102 shut down their external links 104. Thus, the peering network 100, 200 perceives that the external links are down, therefore, it redirects all its NI traffic to the external links 104 remained available thus to the common node 102 remained available. It may be preconfigured which one is the common node 102. This embodiment does not require any signaling or coordination between the two networks 100, 200, therefore, it is the simplest solution.

Figure 24:
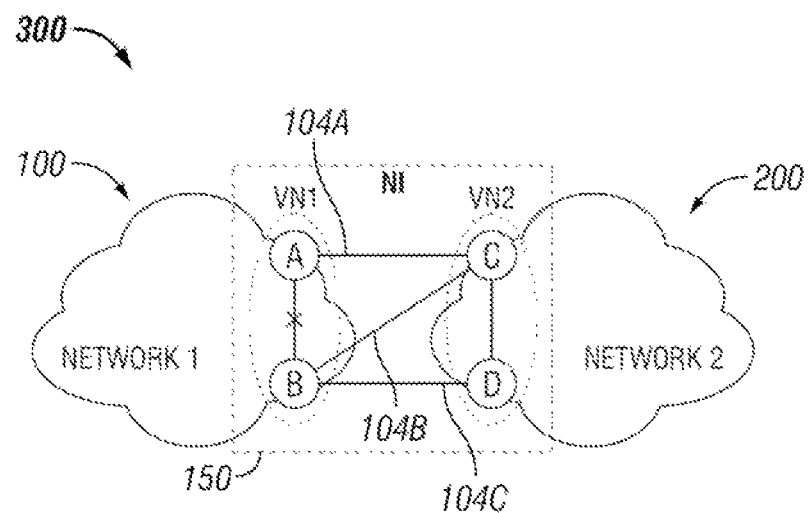
FIG. 24: is a schematic block diagram illustrating a state of an embodiment of a network system.

FIG. 24 illustrates such an operation in more detail. In the example shown in FIG. 24, if the A-B data link goes down, then all services are moved to Node A, i.e., Node A becomes the active one for all services. Node B then puts its external links 104B, 104C into administrative off. Thus Nodes C and D adapt to the remaining external link 104A (i.e., use it for all traffic). The fault handling may be per service or per bundle.

Figure 25:
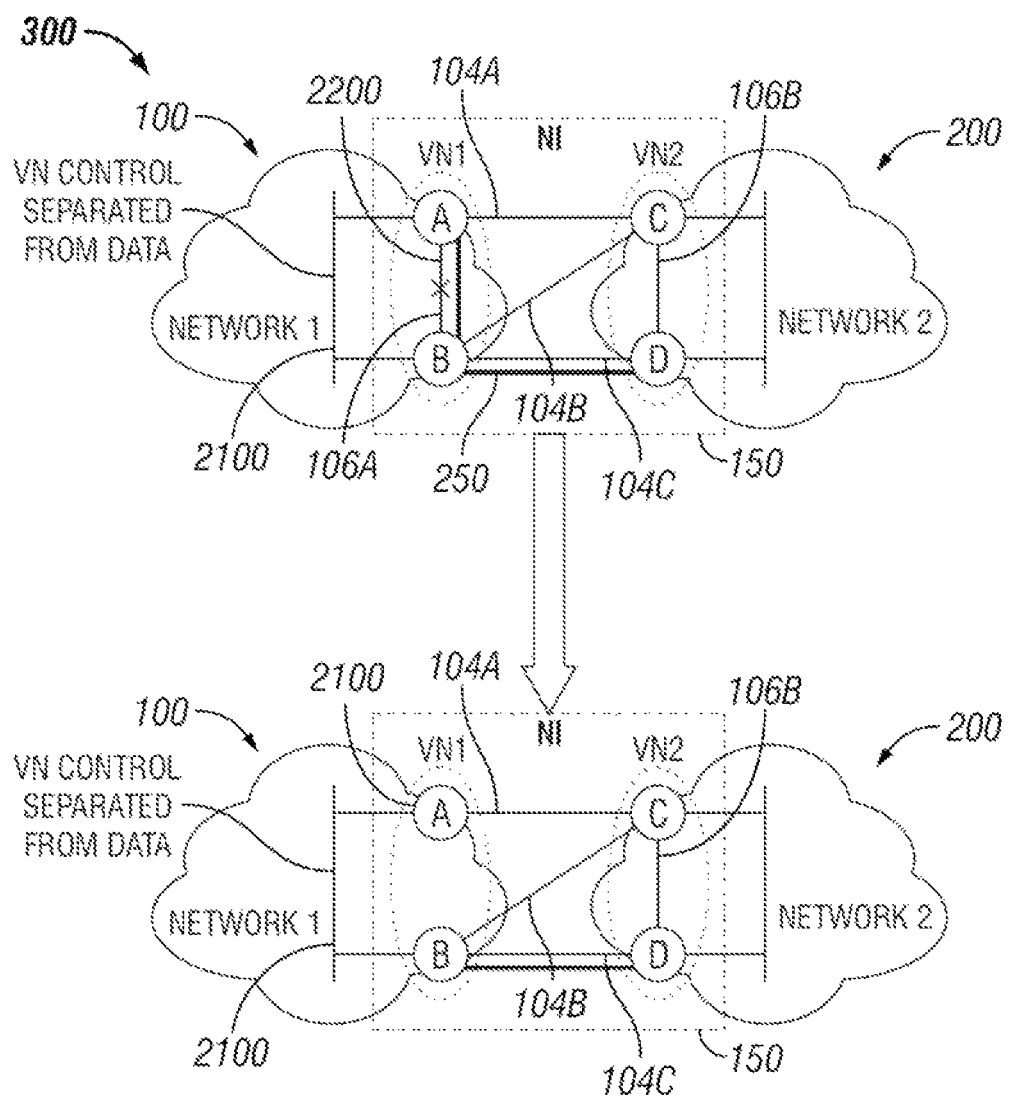
FIG. 25: is a schematic block diagram illustrating an internal link failure handling in a network system.

Congruent services require coordinated external link priorities in order to ensure that the forward and backward paths are the same, which allows for more sophisticated fault handling. That is, the active node 102 has to be only changed for the affected services, which can be determined by the VN because congruency is ensured. A VN is always aware of the single external link 104 the congruent service may be transmitted by the peering operator 100, 200 as both VNs select the same external link 104, which is ensured by the coordinated link priorities. FIG. 25 illustrates such an operation. In the example shown in FIG. 25, the VN1 internal link, i.e. the A-B link goes down. Then the services carried by the A-B link require re-picking, e.g. the services between Nodes A and D transmitted through Node B as indicated by the bolt line 250. For these services, Node B becomes the active node.

In general, the services received on the same external link 104 and destined to an unavailable node 102 require re-picking. This represents a possible bundling granularity, thus the fault can be handled either per bundle or per service. The external link priority influencing bundling is coordinated between the two networks 100, 200.

Figure 26:
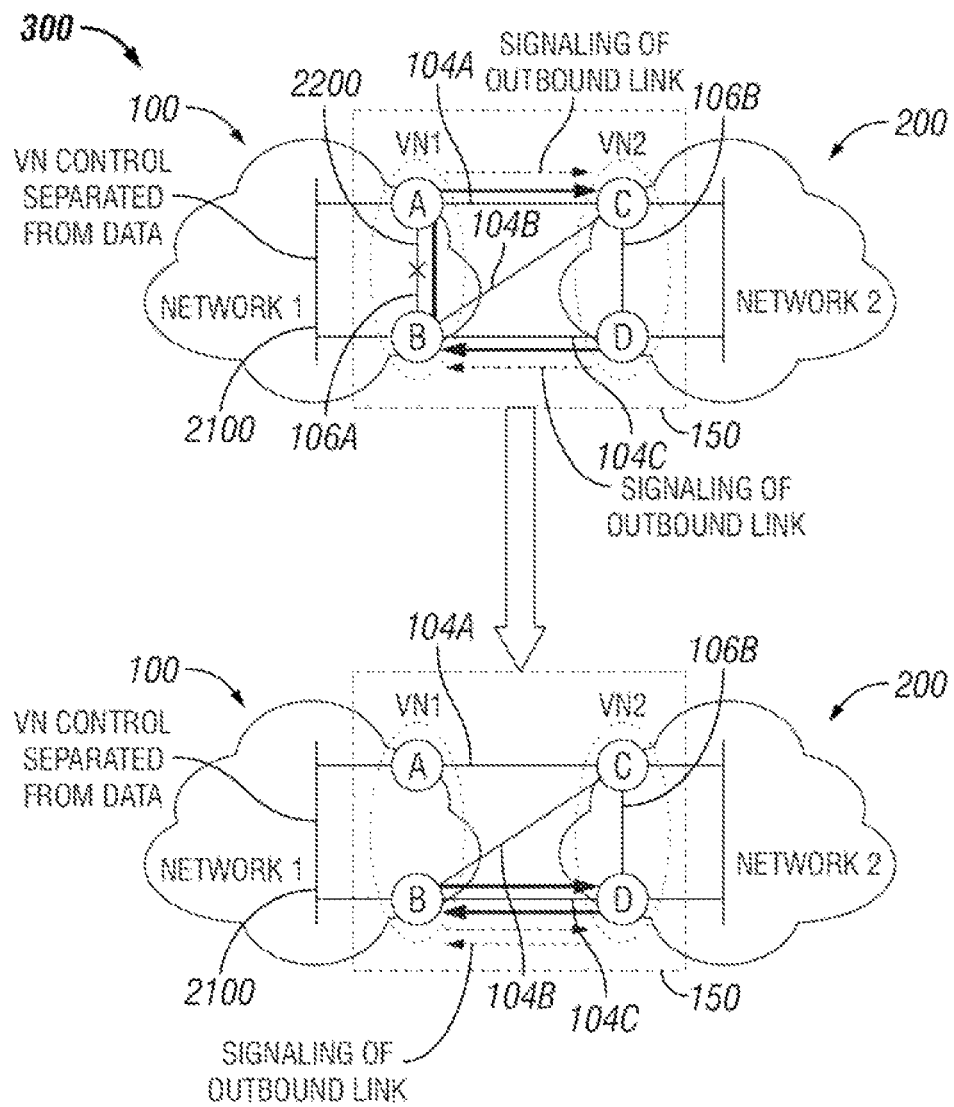
FIG. 26: is a schematic block diagram illustrating an internal link failure handling in a network system.

In case of a non-congruent service, the VN has no clue on which external link 104 the frames of the service are to be expected. Therefore, the VN has no clue on whether or not it should perform re-picking after a failure unless it is informed by some means on the peering VN's use of external links 104. That is, the outbound link has to be signaled to the peering network 100, 200 in order to support proper failure handling. Then, the VN is able to decide whether or not re-picking is needed after the breakdown of the VN internal link 106A. FIG. 26 illustrates such an operation for an example network. In the example shown in FIG. 26, after having the result of the picking, VN1 signals that its outbound link is A-C, VN2 signals that its outbound link is D-B for a particular service. If the VN1 internal A-B link goes down, then VN1 has to only provide re-picking for the services received on the D-B link.

In general, the services received on the same external link 104 and destined to an unavailable node 102 require re-picking. This represents the proposed bundling granularity, thus the fault can be handled either per bundle or per service. If bundling is used, then the bundles have to be coordinated, otherwise the bundle has no meaning and every action has to be done based on the Service ID. Furthermore, re-picking may only be based on a bundle if the signaling is also for bundles, otherwise re-picking has to be service based. The external link priority influencing bundling may only be determined by the peering network 100, 200.

Congruent and the non-congruent approaches may be used in a combined manner if the NI 150 provides congruent and non-congruent services at the same time. However, neither of these can be used in combination with the common approach as that puts links in administrative down, therefore, that is a stand alone approach.

According to an exemplary embodiment, two (or more) parallel internal links 106 are used connecting the same interconnect nodes 102 (e.g. A and B) within a virtual node VN. In this way, parallel internal links 106 may protect each other. These internal links 106 belong to the network interconnect 150 which has the authority to use them for traffic forwarding. These internal links 106 may be implemented in reality as an overlay tunnel within a network 100,200. In this case the control of the overlay tunnel belongs to the control protocol of the network 100, 200, i.e. it is the responsibility of the network protocol to restore/protect the tunnel if it is broken. Nevertheless, it is the network interconnect 150 that uses the tunnel for traffic forwarding.

Generally, an external link 104 can be inactivated by turning its port down.

In the following, possible applications of the above described embodiments for two interface types, for S-tagged and for I-tagged interfaces, will be described in more detail.

In the case of a S-tagged interface, the Service ID may be an SVID. That is, the SVID is used in the above described embodiments as the Service ID. If the SVID used to identify a particular service within the NI 150 differs from that of within an attached network 100, 200, then a VID translation is used at the network to NI boundary port. A VID translation may also be used to implement which NI node port is active and which one is blocked. For instance, the single active port between the NI 150 and the attached network 100, 200 can be enforced by VID translation.

Bundling may be used. A bundling similar to the VID to MSTI bundling in MSTP may be used. Thus the per. MSTI per port variables may be used for implementing the NI 150 if desired. In the following, it is assumed that BID denotes the Bundle ID.

In case of an S-tagged interface, the forwarding decisions are based on the SVID. Even if bundling is used, the BID is determined by the SVID carried in the frame similar to MSTP operation, where the VID determines the assigned MSTI. Therefore, the SVID is used for making the proper forwarding decision either or not data bundling is applied. Control plane bundling has an advantage of reducing the number of control plane variables that have to be maintained.

The same bundling principle can be used for congruent and non-congruent services: the SVIDs received in an attached external link 104 and destined in the same NI node 102 may belong to the same bundle. If this type of bundling is used, then re-picking for fault handling may be performed based on the BID. BID based signaling of outbound link selection is required in case of non-congruent services. If bundling is not used, then re-picking may be done per SVID similarly to the signaling of outbound link selection. MVRP may be used for the signaling of outbound link selection in case of S-tagged interfaces. The forwarding, however, is different for congruent and non-congruent services as described above.

As FIG. 14 shows, there is a single active path for congruent services within the NI 150. Therefore, bundling can be sued for active path enforcement for congruent services. That is, the per port per BID forward variable is only true for the ports comprising the single point to point active path. Therefore, the control plane bundling can also be used as data plane bundling.

As FIG. 15 shows, the port states are not that simple for non-congruent services. First of all, the port states are directed, which is not the case in MSTP implementation. Therefore, extensions would be required to provide BID based path enforcement, e.g. the separation of the ingress and egress port states. Thus the application of data plane bundling is not that advantageous for non-congruent services.

The split horizon in the active nodes 102 may be implemented by VID translation for non-congruent services. The VID translation table may be used as ingress VID translation and the egress VID translation implements the other direction. Thus the required direction of forwarding can be implemented by the VID translation tables. These tables are used to implement that split horizon in the active nodes. The ingress table at a port connected to a passive node 102 translates the SVID used as the service identifier into a bridge local SVID not used for service identification. Only this port and the port active between the NI are in the member set of the bridge local SVID thus frames are forwarded towards the network 100, 200. At the egress port of the active node 102 towards the network 100, 200, the egress VID translation translates the bridge local SVID to the SVID used for the identification of the service within the network 100, 200, which may be the same as the SVID used for identification within the NI 150. Thus frames received from a passive node 102 are not sent out on any external link 104.

In case of an I-tagged interface, the Service ID within the NI 150 may be an I-SID. B-VIDs can be used both for control and data plan bundling. If further bundling is aimed to be used, then the MSTI like one described above for the S-tagged interface can be used to group B-VIDs. Due to scalability issues and the forwarding implementation of bridges the B-VID based bundling may be used in S-tagged interfaces. The forwarding decisions are based on B-VID, i.e., at least a B-VID based data plane bundling is used. B-VID can also be the basis of control plane bundling. Everything described for SVIDs in the previous section can also be applied for B-VIDs. Note that they even have the same Ethertype.

That is split horizon, e.g. has to be implemented based on the B-VIDs for non-congruent services. VID translation may also be used to implement which NI node port is active and which one is blocked. For instance, the single active port between the NI 150 and the attached network 100, 200 can be enforced by VID translation.

The above described embodiments may have the following technical effects. First, emerging network requirements are met. Moreover, the opportunity for network providers is realized to set their network interconnect node priorities independently of each other. Isolating network internal link and network interconnect link and node faults are supported.

The network interconnect 150 described above is simple to implement and operate, and the network interconnect resiliency solution can be applied for the control of an ENNI (External Network Network Interface). Furthermore, it can be also applied for Layer 2 (L2) dual-interconnects, where two networks are connected by two links at L2. This dual-interconnect can be either internal or external. In addition to this, the proposed network interconnect is applicable for an arbitrary number of network interconnect nodes 102 forming a Virtual Node, and for arbitrary external links 104 connecting the networks 100, 200. Some embodiments of the proposed method can also be applied if the Virtual Node principle is not used.

The above described methods enable to very flexibly react to network changes like a network node failure or an internal/external link failure. In this way, the communication between the first network and the second network can be easily maintained. In particular, the reaction of the first network to the network changes can be carried out independently from the reaction of the second network to the network changes.

While the present invention has been described with respect to particular embodiments, those skilled in the art will appreciate the present invention is not limited to the specific embodiments described and illustrated herein. It is to be understood that this disclosure is only illustrative. Accordingly, it is intended that the invention be limited only by the scope of the claims appended hereto.

The invention claimed is:

1. A method of determining an interconnect node for establishment of a forwarding path for transmitting service based data for a given one of a plurality of services within a network system comprising a first network and a second network, wherein the first network comprises:

a plurality of network interconnect nodes connectable to a plurality of external links towards the second network,
one or more internal links connecting the network interconnect nodes with each other, the method comprising:
assigning interconnect node status information to the network interconnect nodes, wherein a network interconnect node to which a passive status is assigned is only allowed to transmit service based data between an external link and another interconnect node of the first network, or between two other interconnect nodes of the first network, and wherein only a network interconnect node to which an active status is assigned is allowed to send or receive service based data to or from the first network, wherein the assignment of the active status to each of the plurality of network interconnect nodes is done a per service basis, such that for each of the plurality of services one of the plurality of network interconnect nodes is assigned the active status, and
determining an interconnect node having an active status for establishment of a forwarding path for the given service, the forwarding path including an external link, wherein the determination is based on the respective status information assigned to the network interconnect nodes for the given service.

2. A method of determining a forwarding path for transmitting service based data for a given one of a plurality of services within a network system that comprises a first network and a second network being connected with each other by a network interconnect, the network interconnect comprising:

a plurality of first network interconnect nodes provided in the first network,
a plurality of second network interconnect nodes provided in the second network,
a plurality of external links connecting the first network interconnect nodes with the second network interconnect nodes, one or more first internal links connecting the first network interconnect nodes and provided within the first network, and
one or more second internal links connecting the second network interconnect nodes and provided within the second network, the method comprising:
assigning interconnect node status information to the first network interconnect nodes and to the second network interconnect nodes, wherein a network interconnect node to which a passive status is assigned is only allowed to transmit service based data between an external link and another interconnect node of the network to which the network interconnect node having the passive status belongs, or between two other interconnect nodes of the network to which the network interconnect node having the passive status belongs, and wherein only a network interconnect node to which an active status is assigned is allowed to send or receive service based data to or from the network to which the network interconnect node having the active status belongs, wherein the assignment of the active status to each of the plurality of first and second network interconnect nodes is done a per service basis, such that for each of the plurality of services one of the plurality of first network interconnect nodes and one of the plurality of second network interconnect nodes is assigned the active status, and
determining a forwarding path for the given service between an interconnect node having an active status and belonging to the first network and an interconnect node having an active status and belonging to the second network based on the respective status information assigned to the network interconnect nodes for the given service, wherein the forwarding path stretches between only two network interconnect nodes having an active status.

3. The method according to claim 2, wherein external link information is assigned to the external links, the forwarding path between the interconnect node having an active status and belonging to the first network, and the interconnect node having an active status and belonging to the second network being determined based on the external link information assigned to the external links for the service for which the forwarding path is established.

4. The method according to claim 3,
wherein the assignment of the interconnect node status information to the first network interconnect nodes or at least a part of the assignment of the external link information to the external links is carried out by the first network in a first assignment process,
wherein the assignment of the interconnect node status information to the second network interconnect nodes or at least a part of the assignment of the external link information to the external links is carried out by the second network in a second assignment process, and
wherein the first network and the second network carry out said assignment processes independently from each other.

5. The method according to claim 4, wherein, in the first assignment process, the first network assigns for the given service at least one of:
interconnect node priority information to the first network interconnect nodes which indicates with which priority a first network interconnect node should be used as interconnect node having an active status for the forwarding path of the given service, and
external link priority information to the external links which indicates with which priority an external link should be used for the forwarding path of the service, and wherein, in the second assignment process, the second network assigns for the given service at least one of:
interconnect node priority information to the second network interconnect nodes which indicates with which priority a second network interconnect node should be used as interconnect node having an active status for the forwarding path of the given service, and
external link priority information to the external links which indicates with which priority an external link should be used for the forwarding path of the given service.

6. The method according to claim 2, wherein the interconnect node status information generated by the first network is distributed to the first network interconnect nodes and to the second network inter connect nodes, wherein the interconnect node status information generated by the second network is distributed to the second network interconnect nodes and to the first network interconnect nodes.

7. The method according to claim 2, wherein at least one of the services is a congruent service in which the part of the forwarding path for transmitting data from the first network to the second network coincides with the part of the forwarding path for transmitting data from the second network to the first network.

8. The method according to claim 7, wherein the interconnect node priority information is generated for a congruent service after having generated the external link priority information for the congruent service.

9. The method according to claim 8, wherein the generation of the interconnect node priority information for a congruent service comprises:
for an individual network interconnect node, determining the external links which are directly connected to the network interconnect node and to which of the directly connected external links the highest priority is assigned for the congruent service, and
assigning the highest priority to the network interconnect node for the congruent service.

10. The method according to claim 7, wherein the external link priority information assigned to the external links for a congruent service is generated based on information which is available for both the first network and the second network.

11. The method according to claim 10, wherein the external link priority information for a congruent service is generated based on link identification numbers assigned to the available external links, respectively, and a service identification number assigned to the congruent service.

12. The method according to claim 11, wherein the external link priority information for a congruent service is generated using the following steps:
sorting the available external links according to the lexicographical order of the link identification numbers,
determining m:=(service identification number) mod (number of available external links), and
assigning the highest priority to the $m_{th}$ external link and the other priorities to the other external links according to the lexicographical order of the link identification numbers.

13. The method according to claim 2, wherein at least one of the services is a non-congruent service in which the part of the forwarding path for transmitting data from the first network to the second network does not coincide with the part of the forwarding path for transmitting data from the second network to the first network.

14. The method according to claim 13, wherein the first network generates for a non-congruent service external link priority information for parts of the forwarding path via which service based data for the non-congruent service is sent from the first network to the second network, and the second network generates for the non-congruent service external link priority information for parts of the forwarding path via which service based data for the non-congruent service is sent from the second network to the first network.

15. The method according to claim 14, wherein, for each non-congruent service, the current external link used by the non-congruent service to send service based data from the first network to the second network is signaled from the first network to the second network, and wherein the current external link used by the non-congruent service to send service based data from the second network to the first network is signaled from the second network to the first network.

16. The method according to claim 13, wherein the interconnect node priority information is generated for a non-congruent service before generating the external link priority information for the non-congruent service.

17. The method according to claim 16, wherein in case of a non-congruent service the interconnect node priority information is generated using the following steps:
sorting the available interconnect nodes according to the lexicographical order of the interconnect node identification numbers,
determining m:=(interconnect node identification number) mod (number of available interconnect nodes), and
assigning the highest priority to the $m_{th}$ interconnect node and the other priorities to the other interconnect nodes according to the lexicographical order of the interconnect node identification numbers.

18. The method according to claim 17, wherein the external link priority information is generated for a non-congruent service using the following steps:
   determining whether, to a network interconnect node, more than one external link is connected,
   if more than one external link is connected, carry out the following processes:
      sorting the connected external links according to the lexicographical order of port identification numbers of the network interconnect node,
      determining m:=(service identification number) mod (number of available external links), and
      assigning the highest priority to the $m_{th}$ external link and the other priorities to the other external links according to the lexicographical order of the port identification numbers.

19. The method according to claim 2, wherein external link status information indicating the status of external links is forwarded to the network interconnect nodes of the first network and the second network.

20. The method according to claim 2, wherein internal link status information indicating the status of internal links provided in the first network is forwarded to the network interconnect nodes of the first network or to the network interconnect nodes of the second network, wherein internal link status information indicating the status of internal links provided in the second network is forwarded to the network interconnect nodes of the second network or to the network interconnect nodes of the first network.

21. The method according to claim 19, wherein the link status information is exchanged using Continuity Check Message (CCM) messages or Link Aggregation Control Protocol Data Units (LACPDUs).

22. The method according to claim 2, wherein, within the first network and the second network, different internal links are respectively used to transmit user data and control data used to control the transmission of user data between two network interconnect nodes.

23. The method according to claim 5, wherein, in case of an external link failure, an internal link failure, a network interconnect node failure, or a change in the number of network interconnect nodes in the first network or in the second network, the forwarding path is redefined for the given service based on the interconnect node priority information and the external link priority information assigned to the given service for which the forwarding path is affected, wherein the redefinition of at least a part of the forwarding path belonging to the first network is done by the first network, and wherein the redefinition of at least a part of the forwarding path belonging to the second network is done by the second network.

24. The method according to claim 23, wherein, in case of an external link failure, the following steps are respectively carried out in the first network and in the second network:
   determining, for a given one of the services that is affected by the failed external link, a highest priority available external link based on the external link priority information, and
   defining, for the given service which is affected by the failed external link, a part of a new forwarding path based on the status information and the determined highest priority available external link.

25. The method according to claim 23, wherein, in case of a network interconnect node failure, for a given one of the services that is affected by the failed interconnect node, the following steps are carried out in the network where the failed network interconnect node is located:
   determining a highest priority available node and assigning an active status to the highest priority available node, if necessary,
   determining the highest priority available external link based on the external link priority information,
   defining a part of a new forwarding path based on the status information and the selected highest priority available external link, wherein, for the given service which is affected by the failed interconnect node, the following steps are carried out in the other network:
      determining a highest priority available external link based on the external link priority information, and
      defining a part of a new forwarding path based on the status information and the selected highest priority available external link.

26. The method according to claim 23, wherein, in case of an internal link failure, in the network where the failed internal link is located, the following steps are carried out:
   changing the status information such that to one single common network interconnect node an active status is assigned for each service,
   deactivating ports of the network interconnect nodes connected to external links which are different from external links connected to the common network interconnect node for each service,
   selecting the highest priority available external link connected to the common network interconnect node for a given service, and
   defining, for a given service affected by the deactivated ports, a part of a new forwarding path based on the status information and the selected highest priority available external link, wherein the following steps are carried out in the other network:
      determining, for the given service which is affected by the deactivated ports, the highest priority available external link based on external link priority information, and
      defining, for the given service which is affected by the deactivated ports, a part of a new forwarding path based on the status information and the determined highest priority available external link.

27. The method according to claim 23, wherein, in case of an internal link failure, in the network where the failed internal link is located, the following steps are carried out:
   determining for which congruent service service based data received via external links is destined to a network interconnect node which is unavailable due to the internal link failure,
   determining, for the congruent service thus determined, the highest priority available interconnect node based on the interconnect node priority information,
   assigning, for the congruent service thus determined, an active status to the highest priority available interconnect node, and
   defining, for the congruent service thus determined, a part of a new forwarding path based on the status information and the external link information.

28. The method according to claim 23, wherein, in case of an internal link failure, in the network where the failed internal link is located, the following steps are carried out:
   determining for which non-congruent service service based data received via external links is destined to a network interconnect node that is unavailable due to the internal link failure, determining, for the non-congruent service thus determined, the highest priority available interconnect node based on the interconnect node priority information, assigning, for the non-congruent service thus determined, an active status to the highest priority available interconnect node, determining which external link will be used for the non-congruent service in order to send service-based data from the network where the failed internal link is located to the other network based on the external link priority information, and signaling this external link to the other network, and defining, for the congruent service, a part of a new forwarding path based on the status information and the external link information.

29. The method according to claim 2, wherein a common bundle identification number is used instead of a service identification number for a group of services for transmitting service based data between the first network and the second network.

30. The method according to claim 29, wherein the group of services comprises the services which are received in one of the first network or the second network via the same external link and which are routed to the same network interconnect node via the first network or the second network.

31. A network, comprising:
a plurality of network interconnect nodes connectable to a plurality of external links towards another network,
one or more internal links connecting the network interconnect nodes with each other, the network being configured to carry out the following processes:
assigning interconnect node status information to the network interconnect nodes, wherein a network interconnect node to which a passive status is assigned is only allowed to transmit service based data between an external link and another interconnect node of the network, or between two other interconnect nodes of the network, and wherein only a network interconnect node to which an active status is assigned is allowed to send or receive service based data to or from the network, wherein the assignment of the active status to each of the plurality of network interconnect nodes is done a per service basis, such that for each of the plurality of services one of the plurality of network interconnect nodes is assigned the active status, and
determining an interconnect node having an active status for establishing a forwarding path for a given one of a plurality of services, the forwarding path including an external link, wherein the determination is based on the respective status information assigned to the network interconnect nodes for the given service.

32. A network system comprising a first network and a second network being connected with each other by a network interconnect, the network interconnect comprising:
a plurality of first network interconnect nodes provided in the first network,
a plurality of second network interconnect nodes provided in the second network,
a plurality of external links connecting the first network interconnect nodes with the second network interconnect nodes,
one or more first internal links connecting the first network interconnect nodes and provided within the first network, and one or more second internal links connecting the second network interconnect nodes and provided within the second network, the network system comprising functionality to carry out the following processes:
assigning interconnect node status information to the first network interconnect nodes and to the second network interconnect nodes, wherein a network interconnect node to which a passive status is assigned is only allowed to transmit service based data between an external link and another interconnect node of the network to which the network interconnect node having the passive status belongs, or between two other interconnect nodes of the network to which the network interconnect node having the passive status belongs, and wherein only a network interconnect node to which an active status is assigned is allowed to send or receive service based data to or from the network to which the network interconnect node having the active status belongs, wherein the assignment of the active status to each of the plurality of first and second network interconnect nodes is done a per service basis, such that for each of the plurality of services one of the plurality of first network interconnect nodes and one of the plurality of second network interconnect nodes is assigned the active status, and
determining a forwarding path for a given one of a plurality of services between an interconnect node having an active status and belonging to the first network and an interconnect node having an active status and belonging to the second network based on the respective status information assigned to the network interconnect nodes for the given service, wherein the forwarding path stretches between only two network interconnect nodes having an active status.

* * * * *

UNITED STATES PATENT AND TRADEMARK OFFICE
CERTIFICATE OF CORRECTION

PATENT NO. : 8,817,594 B2  
APPLICATION NO. : 13/181020  
DATED : August 26, 2014  
INVENTOR(S) : Gero et al.

Page 1 of 1

It is certified that error appears in the above-identified patent and that said Letters Patent is hereby corrected as shown below:

On the Title Page, in Item (75), under "Inventors", in Column 1, Line 2, delete "Kecskemet" and insert -- Kecskemét --, therefor.

In the Specification

In Column 3, Line 56, delete "implemented" and insert -- implemented. --, therefor.

In Column 4, Line 10, delete "link:" and insert -- link --, therefor.

In Column 8, Line 55, delete "system;" and insert -- system. --, therefor.

In Column 9, Line 53, delete "management" and insert -- management. --, therefor.

In Column 15, Line 47, delete "(e.g.," and insert -- e.g., --, therefor.

In Column 16, Line 21, delete "1046," and insert -- 104B, --, therefor.

In Column 20, Line 18, delete "Configured" and insert -- configured --, therefor.

In the Claims

In Column 30, Line 48, in Claim 27, delete "service service" and insert -- service --, therefor.

In Column 30, Line 64, in Claim 28, delete "service service" and insert -- service --, therefor.

Signed and Sealed this  
Twenty-fifth Day of August, 2015

Michelle K. Lee  
*Director of the United States Patent and Trademark Office*